United States Patent
Sakakibara et al.

(10) Patent No.: US 12,235,481 B2
(45) Date of Patent: Feb. 25, 2025

(54) POLARIZING PLATE

(71) Applicant: DEXERIALS CORPORATION, Tokyo (JP)

(72) Inventors: Shigeshi Sakakibara, Miyagi (JP); Akio Takada, Miyagi (JP); Kazuyuki Shibuya, Miyagi (JP); Toshiaki Sugawara, Miyagi (JP); Yuusuke Matsuno, Miyagi (JP)

(73) Assignee: DEXERIALS CORPORATION, Tokyo (JP)

( * ) Notice: Subject to any disclaimer, the term of this patent is extended or adjusted under 35 U.S.C. 154(b) by 31 days.

(21) Appl. No.: 16/627,638

(22) PCT Filed: Jul. 12, 2019

(86) PCT No.: PCT/JP2019/027718
§ 371 (c)(1),
(2) Date: Dec. 30, 2019

(87) PCT Pub. No.: WO2020/017455
PCT Pub. Date: Jan. 23, 2020

(65) Prior Publication Data
US 2021/0302639 A1    Sep. 30, 2021

(30) Foreign Application Priority Data

Jul. 19, 2018 (JP) .................. 2018-135721

(51) Int. Cl.
*G02B 5/30* (2006.01)
*G03B 21/00* (2006.01)
*G03B 21/14* (2006.01)

(52) U.S. Cl.
CPC .......... *G02B 5/3058* (2013.01); *G03B 21/006* (2013.01); *G03B 21/14* (2013.01)

(58) Field of Classification Search
CPC ...... G02B 5/3058; G02B 5/3025; G02B 5/30; G02B 27/28; G03B 21/006; G03B 21/14; G03B 21/2073; G02F 1/1335
See application file for complete search history.

(56) References Cited

U.S. PATENT DOCUMENTS 10,209,421 B2   2/2019  Takeda
10,436,964 B2  10/2019  Takada et al.
(Continued)

FOREIGN PATENT DOCUMENTS

CN    108254821 A   7/2018
JP    2003-502708 A  1/2003
(Continued)

OTHER PUBLICATIONS

WO2013046921, published Apr. 4, 2013, English Machine Language Translation, generated Sep. 20, 2021 (Year: 2013).*
(Continued)

*Primary Examiner* — Stephone B Allen
*Assistant Examiner* — Adam W Booher
(74) *Attorney, Agent, or Firm* — Oliff PLC

(57) ABSTRACT

A polarizing plate having excellent optical properties includes: a transparent substrate that is transparent to light in a used wavelength band; grid-shaped protrusions arranged on the transparent substrate at a pitch shorter than the wavelength of light in the used band, extending in a predetermined direction, and has a reflective layer and a reflection control layer; and a groove which is recessed between the grid-shaped protrusions and whose width in a direction orthogonal to the predetermined direction is reduced to zero in the depth direction. This improves transmittance and reflectance properties, thereby achieving excellent optical properties.

14 Claims, 16 Drawing Sheets

(56) References Cited

U.S. PATENT DOCUMENTS

| | | | |
|---|---|---|---|
| 2006/0087602 A1 | 4/2006 | Kunisada et al. | |
| 2009/0273728 A1* | 11/2009 | Song | G02F 1/133536 349/62 |
| 2012/0105745 A1* | 5/2012 | Kumai | G02B 5/3058 349/5 |
| 2016/0054497 A1* | 2/2016 | Takahashi | C23F 1/12 359/485.04 |
| 2018/0180786 A1* | 6/2018 | Takeda | G02B 5/3058 |

FOREIGN PATENT DOCUMENTS

| | | | | |
|---|---|---|---|---|
| JP | 2006-330178 A | 12/2006 | | |
| JP | 2010-85990 A | 4/2010 | | |
| JP | 2012-103728 A | 5/2012 | | |
| JP | 2014-052439 A | 3/2014 | | |
| JP | 2014-186181 A | 10/2014 | | |
| JP | 2015-34959 A | 2/2015 | | |
| JP | 6302040 B1 * | 3/2018 | | G02B 1/14 |
| JP | 6312917 B1 | 4/2018 | | |
| JP | 2018-106129 A | 7/2018 | | |
| WO | 2013/046921 A1 | 4/2013 | | |

OTHER PUBLICATIONS

May 19, 2021 Office Action issued in Chinese Patent Application No. 201980003256.9.

Oct. 1, 2019 Search Report isssused in International Patent Application No. PCT/JP2019/027718.

Nov. 25, 2021 Office Action issued in Chinese Application No. 201980003256.9.

Mar. 1, 2022 Office Action issued in Chinese Application No. 201980003256.9.

Jul. 5, 2022 Office Action issued in Japanese Application No. 2018-135721.

Aug. 18, 2022 Office Action issued in Chinese Patent Application No. 201980003256.9.

Oct. 17, 2023 Office Action issued in Japanese Application No. 2023-038233.

* cited by examiner

POLARIZING PLATE

TECHNICAL FIELD

The present disclosure relates to a wire grid polarizing plate. This application claims priority on the basis of Japanese Patent Application No. 2018-135721 filed in Japan on Jul. 19, 2018, which is incorporated by reference herein.

BACKGROUND ART

Wire grid polarizing plates are highly durable and thus suited for applications such as liquid crystal projectors having high light densities. In such polarizing plates, an important optical property requirement is low reflectance. High reflectance might otherwise cause a liquid crystal panel to malfunction or degrade image quality with stray light.

In recent years, there has been an increased desire for lower reflectances in polarizing plates due to increased luminance and definition in liquid crystal projectors. Wire grid polarizing plates are provided with, for example, a reflective layer, a dielectric layer, and an absorbing layer; reflectance of s-polarized light parallel with the wire grid is suppressed using absorption effects of an upper portion constituted by the dielectric layer and absorbing layer as well as with interference effects of the three layers (for example, see PLT 1).

CITATION LIST

Patent Literature

PLT 1: Japanese Unexamined Patent Application Publication No. 2012-103728

SUMMARY OF INVENTION

Technical Problem

In the above-described wire grid polarizing plate, grooves exposing the material of the substrate or the material of the underlying layer on the substrate may be formed between the grids, but excellent optical properties may not be obtained depending on the shape of the grooves.

Solution to Problem

The present disclosure has been proposed in view of such circumstances, and provides a polarizing plate having excellent optical properties.

As a result of intensive investigation, the present inventors have found that excellent optical properties can be obtained by reducing the width of the groove to zero in the depth direction, and have thus completed the present technique.

That is, a polarizing plate according to the present invention includes: a transparent substrate that is transparent to light in a used wavelength band; grid-shaped protrusions arranged on the transparent substrate at a pitch shorter than the wavelength of the light in the used band, extending in a predetermined direction, and having a reflective layer and a reflection control layer; and a groove which is recessed between the grid-shaped protrusions and whose width in a direction orthogonal to the predetermined direction is reduced to zero in the depth direction.

In addition, an optical device according to the present disclosure is equipped with the above-described polarizing plate.

Furthermore, a method of manufacturing a polarizing plate according to the present disclosure includes: etching a reflective layer and a reflection control layer laminated on a transparent substrate that is transparent to light in a used wavelength band to form grid-shaped protrusions arranged at a pitch shorter than the wavelength of light in the used band and extending in a predetermined direction, and a groove which is recessed between the grid-shaped protrusions and whose width in a direction orthogonal to the predetermined direction is reduced to zero in the depth direction.

This disclosure improves transmittance and reflectance properties and thus achieves excellent optical properties by reducing the width of the groove to zero in the depth direction.

DESCRIPTION OF EMBODIMENTS

Hereinafter, embodiments of the present disclosure will be described in detail in the following order with reference to the drawings.
1. Polarizing plate
2. Polarizing plate manufacturing method
3. Optical device
4. Examples 1. Polarizing Plate A polarizing plate according to the present embodiment includes: a transparent substrate that is transparent to light in a used wavelength band; a grid-shaped protrusions arranged on the transparent substrate at a pitch shorter than the wavelength of the light in the used band, extending in a predetermined direction, and having a reflective layer and a reflection control layer; a groove which is recessed between the grid-shaped protrusions and whose width in a direction orthogonal to the predetermined direction is reduced to zero in the depth direction. Here, the groove may be recessed in the transparent substrate or may be recessed in an underlying layer formed on the transparent substrate. The underlying layer is preferably made of a dielectric having a refractive index equal to or lower than that of the transparent substrate, and is preferably made of a Si oxide such as $SiO_2$.

Figure 1:
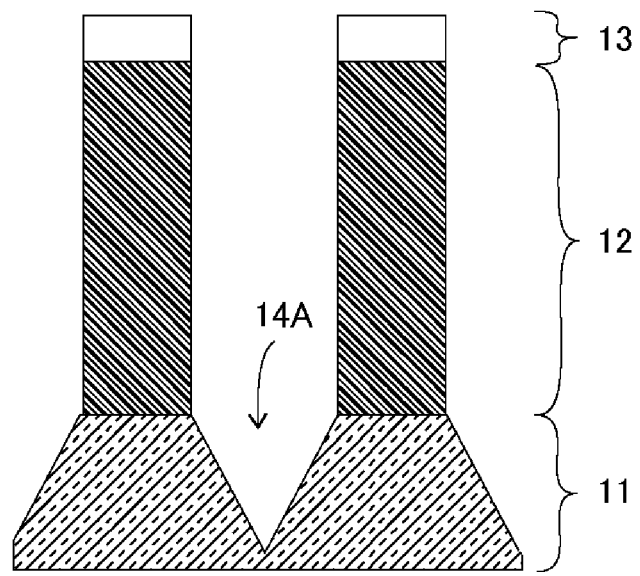
FIG. 1 is a cross-sectional view schematically showing a structure of a polarizing plate in which a groove has a substantially V-shaped cross-sectional shape.
Figure 2:
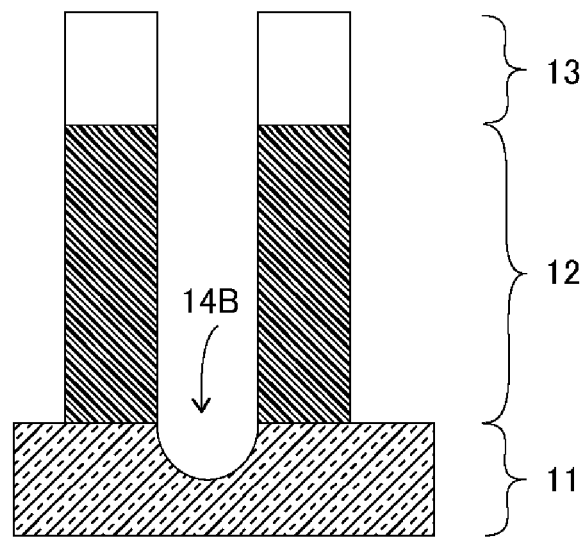
FIG. 2 is a cross-sectional view schematically showing a structure of a polarizing plate in which a groove has a substantially U-shaped cross-sectional shape.

FIG. 1 is a cross-sectional view schematically showing a structure of a polarizing plate in which a groove has a substantially V-shaped cross-sectional shape; FIG. 2 is a cross-sectional view schematically showing a structure of a polarizing plate in which a groove has a substantially U-shaped cross-sectional shape; and FIG. 3 is a cross-sectional view schematically showing a structure of a polarizing plate in which a groove has an asymmetric cross-sectional shape.

Figure 3:
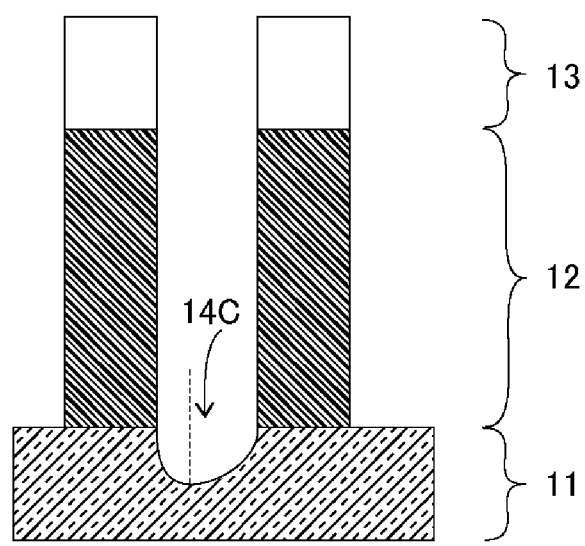
FIG. 3 is a cross-sectional view schematically showing a structure of a polarizing plate in which a groove has an asymmetric cross-sectional shape.

As shown in FIGS. 1 to 3, the polarizing plate includes: a transparent substrate 11; grid-shaped protrusions having a reflective layer 12 and a reflection control layer 13; and grooves 14A, 14B, and 14C formed between the grid-shaped protrusions.

The grid-shaped protrusions have at least a reflective layer 12 and a reflection control layer 13. The pitch of the grid-shaped protrusions is smaller than the wavelength of light in the use band, and more specifically, it is preferably 100 to 200 nm. In addition, the ratio of the length in the direction parallel to the longitudinal direction (Y direction) of the wire grid to the height of the lattice-shaped projection is preferably 1,000 or more. The ratio of the length in the Y direction to the depth of the grooves 14A, 14B, and 14C is preferably 1,000 or more. The grid-shaped protrusions and the grooves 14A, 14B, and 14C are preferably parallel to the Y direction. As a result, the transmittance and reflectance in the plane can be made uniform even when used in a liquid crystal element formed of pixels of micron size.

The reflective layer 12 is formed by a light-reflective material having a reflection property for light in a wavelength band to be used extending in a band shape in the Y direction which is an absorption axis. The reflective layer 12 thus functions as a wire grid polarizer that, for light propagating toward and entering a surface of the transparent substrate on which the wire grid is formed, attenuates polarized waves (TE waves (s-waves)) having an electric field component in a direction (Y direction) parallel with the lengthwise direction of the wire grid and transmits polarized waves (TM waves (p-waves)) having an electric field component in a direction (X direction) orthogonal to the lengthwise direction of the wire grid.

The reflection control layer 13 attenuates TE wave by a polarization-selective light-absorbing effect. By appropriately adjusting the configuration of the reflection control layer 13, it is possible to partially reflect TE waves reflected by the reflective layer 12 passing through the reflection control layer 13 so as to return to the reflective layer 12, and to attenuate the light passing through the reflection control layer 13 via interference.

As will be described later, for example, the reflection control layer 13 may be configured as a multilayer film constituted of an absorbing layer made of a light absorbing material having absorption properties for light in a wavelength band to be used and a dielectric layer made of a dielectric, or as a reflection suppressing layer made of a mixture of the light absorbing material and the dielectric.

The width of the grooves 14A, 14B, and 14C in the direction orthogonal to the predetermined direction are reduced to zero in the depth direction toward the deepest point. In other words, the cross-sectional structure of the groove has an air portion and the air portion becomes larger with respect to the substrate material along the direction from the deepest point toward the substrate surface. Further, it is preferable that the shape of the cross section of the groove in the direction orthogonal to the predetermined direction, that is, the shape of the cross section of the groove when viewed from the predetermined direction, does not have a bottom surface. Here, the phrase "does not have the bottom surface" means that the width of the bottom portion in the direction orthogonal to the predetermined direction is 10 nm or less.

As in the groove 14A shown in FIG. 1, the shape of the cross section of the groove in the direction orthogonal to the predetermined direction can be substantially V-shaped. Thus, in the green wavelength band (wavelength: 520 to 590 nm) and the red wavelength band (wavelength: 600 to 680 nm), excellent optical properties can be obtained by increasing the transmission axis transmittance Tp and decreasing the transmission axis reflectance Rp. Further, when the cross-sectional shape of the groove is substantially V-shaped, a decrease in the transmission axis transmittance Tp in the blue wavelength band (wavelength: 430 to 510 nm) can be suppressed as compared with a case where the cross-sectional shape of the groove is rectangular.

In addition, the depth of the groove in which the cross-sectional shape is substantially V-shaped is preferably from 20 to 100 nm, more preferably from 60 to 100 nm. This increases the transmission axis transmittance Tp and decreases the transmission axis reflectance Rp, whereby achieving excellent optical properties.

Alternatively, as in the groove 14B shown in FIG. 2, the shape of the cross section of the groove in the direction orthogonal to the predetermined direction can be substantially U-shaped. Thus, in the case where the cross-sectional shape of the groove is substantially U-shaped, as in the case where the cross-sectional shape of the groove is substantially V-shaped, excellent optical properties can be obtained by increasing the transmission axis transmittance Tp and decreasing the transmission axis reflectance Rp in the green wavelength band (wavelength: 520 to 590 nm) and the red wavelength band (wavelength: 600 to 680 nm). Further, when the cross-sectional shape of the groove is substantially U-shaped, a decrease in the transmission axis transmittance Tp in the blue wavelength band (wavelength: 430 to 510 nm) can be suppressed as compared to when the cross-sectional shape of the groove is rectangular.

In addition, the depth of the groove in which the cross-sectional shape is substantially U-shaped is preferably from 20 to 120 nm, more preferably from 60 to 100 nm. This increases the transmission axis transmittance Tp and decreases the transmission axis reflectance Rp, whereby achieving excellent optical properties.

Further, as in the groove 14C shown in FIG. 3, the shape of the cross section of the groove in the direction orthogonal to the predetermined direction can be asymmetric with respect to the perpendicular line passing through the midpoint of the width at which the depth of the groove is zero. That is, in the cross-sectional shape of the groove, the deepest point may not be on the perpendicular line passing through the midpoint of the width at which the depth of the groove is zero. More specifically, it is preferable that the angle between the perpendicular line passing through the midpoint (origin) of the width at which the depth of the groove is zero and the straight line passing through the deepest point of the groove and the origin is within ±20°. As a result, it is possible to obtain optical properties equivalent to those of a polarizing plate whose angle between the deepest point of the groove and the straight line passing through the origin is 0°, that is, a polarizing plate whose cross section in a direction orthogonal to a predetermined direction is symmetrical with respect to the perpendicular line passing through the midpoint of the width at which the depth of the groove is zero.

Further, by making the shape of the cross section of the groove asymmetric, at least one of the slopes becomes smaller than the other, it is possible to facilitate the formation of a protective film such as a dielectric portion and a water-repellent portion.

The protective film is provided on the surface of the grid-shaped protrusions and the surface of the groove between the grid-shaped protrusions by forming a film of a dielectric portion or a water-repellent portion, among other portions, and provides a moisture-resistant effect or a water-repellent effect, among other effects, thereby improving reliability.

Examples of dielectrics constituting the dielectric portion include common materials such as Si oxides such as $SiO_2$, metal oxides such as $Al_2O_3$, beryllium oxide, bismuth oxide, $MgF_2$, cryolite, germanium, titanium dioxide, silicon, magnesium fluoride, boron nitride, boron oxide, tantalum oxide, carbon, or combinations of these materials.

Among these, Si oxide such as $SiO_2$ is preferably used.

The water-repellent portion is formed by using a water-repellent compound, and prevents moisture from entering between the grids by capillary action. Specific water-repellent compounds include silane compounds or phosphoric acid compounds having fluoroalkyl groups or alkyl groups, and the carbon number of the alkyl chain is preferably 4 to 20. Specific examples of the silane compound include FDTS (heptadecafluoro-1,1,2,2-tetrahydrodecyltrichlorosilane), PETS (pentafuorophenylpropyltrichlorosilane), FOTS ((tridecafluoro-1,1,2,2-tetrahydrooctyl) trichlorosilane), and OTS (n-octadecyltrichlorosilane, (C18)). Specific examples of the phosphoric acid compound include FOPA (1H, 1H, 2H, 2H-perfuoro-n-octylphosphonic acid), FDPA (1H, 1H, 2H, 2H-perfluoro-n-decylphosphonic acid), FHPA (1H, 1H, 2H, 2H-perfluoro-n-hexylphosphonic acid), and ODPA (octadecylphosphonic acid). When the shape of the cross-section of the groove is asymmetric, at least one of the slopes becomes smaller than the other, so that the water-repellent compound can be introduced into the groove by a coating method such as CVD or dip coating.

An optical member in such a configuration can use four effects of transmission, reflection, interference, and polarization-selective light absorption to attenuate polarized waves (TE waves (s-waves)) having an electric field parallel with the lattice pattern of the reflective layer and transmit polarized waves (TM waves (p-waves)) having an electric field perpendicular to the lattice pattern. Thus, TE waves are attenuated by the polarization-selective light-absorbing effect of the reflection-suppressing layer, and TE waves transmitted through the reflection control layer are reflected by the lattice-shaped reflecting layer functioning as a wire grid.

Here, by reducing the width of the groove between the grids to zero in the depth direction, the transmittance and the reflectance properties can be improved, and excellent optical properties can be obtained. Further, since the customer demand for the transmittance properties is 0.1% level, it is extremely beneficial from an industrial standpoint that the groove structure can be optimized and the optical properties can be improved only by changing the manufacturing process of the polarizing plate without significantly changing the structure of the polarizing plate.

Embodiment 1

Figure 4:
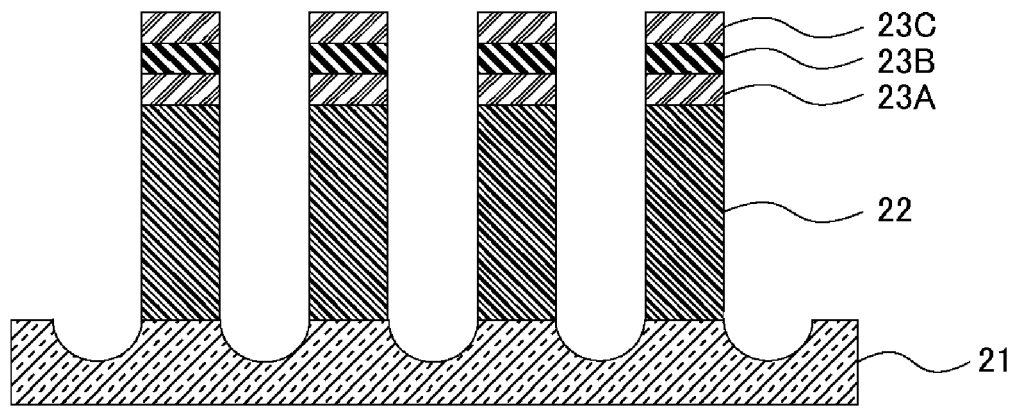
FIG. 4 is a cross-sectional view schematically showing a structure of a polarizing plate shown as Embodiment 1.

FIG. 4 is a cross-sectional view schematically showing the structure of a polarizing plate shown as Embodiment 1. As shown in FIG. 4, the polarizing plate includes: a transparent substrate 21 that is transparent to light in a used wavelength band; grid-shaped protrusions including a reflective layer 22 arranged on the transparent substrate at a pitch shorter than the wavelength of light in the used band and extending in a predetermined direction, a first dielectric layer 23A, an absorbing layer 23B, and a second dielectric layer 23C arranged in this order; and a groove which is recessed between the grid-shaped protrusions and whose width in a direction orthogonal to the predetermined direction is reduced to zero in the depth direction. That is, the polarizing plate shown in Embodiment 1 has a reflection control layer constituted by the first dielectric layer 23A, the absorbing layer 23B, and the second dielectric layer 23C.

The transparent substrate 21 is not particularly limited as long as it is transparent to light in the used band and can be appropriately selected according to the purpose. The phrase "transparent to light of the used band" means that the transparent substrate has a transmittance sufficient to have a transparency allowing functioning as a polarizing plate in the used band of light used with the polarizing plate and does not mean a transmittance of 100%. An example of light in the used band is visible light, which has a wavelength of approximately 380 to 810 nm.

The reflective layer 22 is not particularly limited as long as it is a material that is reflective of light in the used band, and a single metal such as Al, Ag, Cu, Mo, Cr, Ti, Ni, W, Fe, Si, Ge, Te or an alloy or a semiconductor material containing these can be used.

The first dielectric layer 23A is formed, for example, with a film thickness such that, with respect to the phase of the polarized light reflected by the absorbing layer 23B, the phase of the polarized light transmitted through the absorbing layer 23B and reflected by the reflective layer 22 is shifted by half a wavelength. In practice, even if the film thickness is not optimized, the light reflected by the absorbing layer 23B can be absorbed to improve the contrast, so that the thickness may be determined based on the balance between desired polarization properties and actual manufacturing processes.

Examples of materials for first dielectric layer 23A include common materials such as Si oxide such as $SiO_2$, metal oxide such as $Al_2O_3$, beryllium oxide, bismuth oxide, $MgF_2$, cryolite, germanium, titanium dioxide, silicon, magnesium fluoride, boron nitride, boron oxide, tantalum oxide, carbon, or combinations of these materials. Among these, Si oxide is preferably used.

Moreover, the absorbing layer 23B is made of a light absorbing material such as a metal or semiconductor material exhibiting a light absorbing effect and having a refractive index with a non-zero extinction coefficient and is selected as appropriate according to the light in the used band. Examples of usable metal materials are Ta, Al, Ag, Cu, Au, Mo, Cr, Ti, W, Ni, Fe, and Sn, among others, as individual elements or in an alloy including one or more of these elements. Examples of semiconductors which may be used are Si, Ge, Te, ZnO, and silicide materials ($\beta$-$FeSi_2$, $MgSi_2$, $NiSi_2$, $BaSi_2$, $CrSi_2$, $CoSi_2$, and $TaSi_2$, among others). As the light absorbing material, carbon materials such as carbon nanotubes and graphene may be used. Use of these materials can achieve high extinction ratios in a polarizing plate for the applicable visible light region. Among these materials, it is preferable to include Fe or Ta together with Si.

The second dielectric layer 23C can be made of the same material as that of the first dielectric layer 23A, and Si oxide such as $SiO_2$ is preferably used.

Embodiment 2

Figure 5:
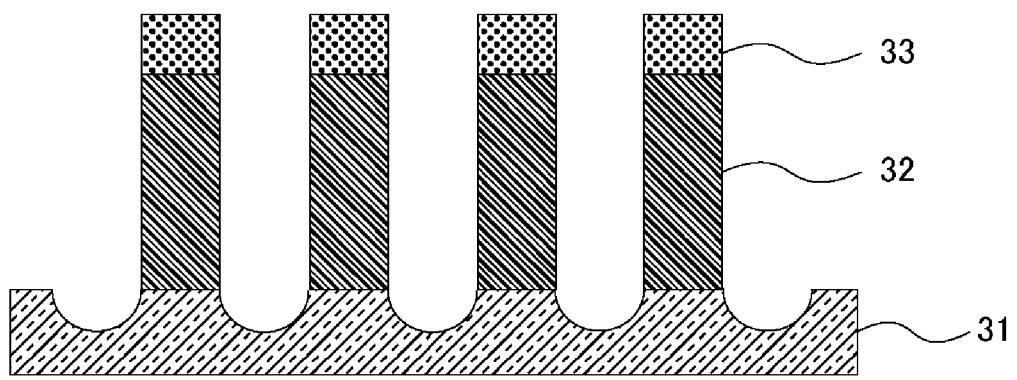
FIG. 5 is a cross-sectional view schematically showing a structure of a polarizing plate shown as Embodiment 2.

FIG. 5 is a cross-sectional view schematically illustrating the structure of a polarizing plate shown as Embodiment 2. The polarizing plate shown in FIG. 5 includes: a transparent substrate 31 that is transparent to light in a used wavelength band; grid-shaped protrusions including a reflective layer 32 arranged on the transparent substrate at a pitch shorter than the wavelength of the light in the used wavelength band and extending in a predetermined direction, and a reflection suppressing layer 33 in which a light-absorbing material and a dielectric are mixed; and a groove which is recessed between the grid-shaped protrusions and whose width in a direction orthogonal to the predetermined direction is reduced to zero in the depth direction. That is, the polarizing plate shown in Embodiment 2 has a reflection control layer constituted by the reflection suppressing layer 33 in which a light absorbing material and a dielectric are mixed.

The transparent substrate 31 and the reflective layer 32 are the same as those of the transparent substrate 21 and the reflective layer 22 of the polarizing plate shown in Embodiment 1 described above, and therefore their descriptions are omitted here.

The reflection suppressing layer 33 is formed by mixing a light absorbing material and a dielectric, and has a concentration distribution in which, for example, the concentration of the light absorbing material or the dielectric is inclined in the layer thickness direction.

Examples of the light absorbing material include a metal material, a semiconductor material, among other materials which are suitably selected according to light in the used band. Examples of usable metal materials are Ta, Al, Ag, Cu, Au, Mo, Cr, Ti, W, Ni, Fe, and Sn, among others, as individual elements or in an alloy including one or more of these elements. Examples of semiconductors which may be used are Si, Ge, Te, ZnO, and silicide materials ($\beta$-$FeSi_2$, $MgSi_2$, $NiSi_2$, $BaSi_2$, $CrSi_2$, $CoSi_2$, and $TaSi_2$, among others). As the light absorbing material, carbon materials such as carbon nanotubes and graphene may be used. Use of these materials can achieve high extinction ratios in a polarizing plate for the applicable visible light region. Among these materials, it is preferable to include Fe or Ta together with Si.

Examples of dielectric include common materials such as Si oxide such as $SiO_2$, metal oxide such as $Al_2O_3$, beryllium oxide, bismuth oxide, $MgF_2$, cryolite, germanium, titanium dioxide, silicon, magnesium fluoride, boron nitride, boron oxide, tantalum oxide, carbon, or combinations of these materials. Among these, Si oxide is preferably used.

MODIFIED EMBODIMENT

Figure 6:
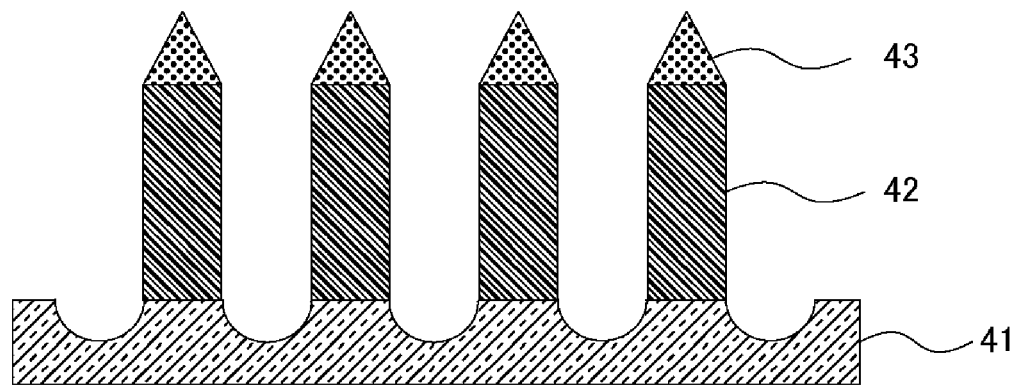
FIG. 6 is a cross-sectional view schematically showing a structure of a polarizing plate shown as a modified embodiment.

FIG. 6 is a cross-sectional view schematically showing a structure of a polarizing plate shown as a modified embodiment. As shown in FIG. 6, the polarizing plate includes: a transparent substrate 41 that is transparent to light in a used wavelength band; grid-shaped protrusions including a reflective layer 42 arranged on the transparent substrate at a pitch shorter than the wavelength of the light in the used wavelength band and extending in a predetermined direction, and a reflection suppressing layer 43 in which a light-absorbing material and a dielectric are mixed and whose width in a direction orthogonal to the predetermined direction becomes smaller toward the tip side; and a groove which is recessed between the grid-shaped protrusions and whose width in a direction orthogonal to the predetermined direction is reduced to zero in the depth direction. That is, as compared to the polarizing plate shown as the Embodiment 2, the polarizing plate shown as this modified embodiment has the reflection suppressing layer 33 whose width becomes narrower toward the tip side as viewed from the predetermined direction.

The transparent substrate 41 and the reflective layer 42 are the same as those of the transparent substrate 31 and the reflective layer 32 of the polarizing plate shown in the aforementioned Embodiment 2, respectively, and therefore, the description thereof is omitted here.

The reflection suppressing layer 43 is formed by mixing a light absorbing material and a dielectric, and has a concentration distribution in which, for example, the concentration of the light absorbing material or the dielectric is inclined in the layer thickness direction. As the light absorbing material and the dielectric, the same materials as in Embodiment 2 can be used.

In addition, the reflection suppressing layer 43 has a grid tip portion whose width in a direction orthogonal to the predetermined direction becomes smaller toward the tip side. The grid tip has a tapered shape such as an isosceles trapezoid shape. Tapering the grid tip can improve the transmittance of the TM wave. This is considered to suppress scattering of incident light with angular dispersion.

Although the above-described modification has been described as a modification of the polarizing plate shown in Embodiment 2, it may be a modification of the polarizing plate shown in Embodiment 1. In a modification of the polarizing plate shown in Embodiment 1, the grid tip comprises a first dielectric layer 23A, an absorbing layer 23B, and a second dielectric layer 23C.

2. Manufacturing Method of Polarizing Plate

Next, a method of manufacturing a polarizing plate according to the present embodiment will be described. A method of manufacturing a polarizing plate according to the present embodiment includes: etching a reflective layer and a reflection control layer laminated on a transparent substrate that is transparent to light in a used wavelength band to form grid-shaped protrusions arranged at a pitch shorter than the wavelength of light in the used band and extending in a predetermined direction, and a groove which is recessed between the grid-shaped protrusions and whose width in a direction orthogonal to the predetermined direction is reduced to zero in the depth direction.

Hereinafter, a method of manufacturing a polarizing plate will be described in detail. First, in a film-forming step of various films, a reflective layer and a reflection control layer are laminated on a transparent substrate by, for example, a sputtering method. Next, a photosensitive resin is applied as a resist, exposure and development are performed, and a lattice-shaped pattern of the resist is formed.

Next, a grid pattern made of a resist is transferred to the reflective layer and the reflection control layer in a lower layer to form grid-shaped protrusions having the reflective layer and the reflection control layer, and to form a groove which is recessed between the grid-shaped protrusions. Since the reflective layer, the reflection control layer, and the transparent substrate are different materials and have different etching properties, it is preferable to change the etching gas in accordance with the materials. For example, when aluminum is employed as the reflective layer, a chlorine-based plasma is preferably used, and when $SiO_2$ or FeSi is employed as the reflection control layer, a fluorine-based plasma is preferably used. When $Al_2O_3$ is employed, $BCl_3$ is preferably used. By using different etching gases depending on the material, it is possible to prevent the cross-sectional shape of the boundary of the material from being disturbed due to the difference in etchability, and it is possible to suppress the degradation of optical properties.

In this embodiment, by optimizing etching conditions (gas flow rate, gas pressure, output, and cooling temperature of the transparent substrate, among others), a groove is formed so that the width of the cross-sectional shape is reduced to zero in the depth direction. A plasma etching apparatus is preferably used to form the grooves. When the material is $SiO_2$, the etching gas is preferably a mixed gas of CF-based gas (especially $CF_4$) and Ar, and the gas pressure is preferably 0.5 to 1.0 Pa, and the bias is preferably 40 to 200 W. When the $SiO_2$ is made of a material containing Al, a Cl-based gas (especially a mixed gas of $Cl_2$ and $BCl_3$) is preferably used as the etching gas, the gas pressure is preferably 0.5 to 1.0 Pa, and the bias is preferably 30 to 50 W. Thus, the groove is formed so that the width of the cross-sectional shape is reduced to zero in the depth direction, and a polarizing plate having excellent optical properties can be obtained.

Further, a protective film such as a dielectric portion or a water-repellent portion may be formed on the surface of the grid-shaped protrusions and the surface of the groove between the grid-shaped protrusions. A physical vapor deposition method, a chemical vapor deposition method, or the like can be used for forming a film of the dielectric portion. Among these methods, the ALD method (Atomic Layer Deposition or Atomic Deposition) is particularly preferable. As a result, even in the trench structure having a high aspect ratio, the dielectric can be uniformly adhered to the details of the trench.

The water-repellent portion can be formed by applying a water-repellent compound to the surface of the grid-shaped protrusions and the surface of the groove between the grid-shaped protrusions. Examples of the coating method of the water-repellent compound include dip coating, spin coating, and vapor treatment. Among these, it is particularly preferable to use a vapor treatment. Thus, the water-repellent compound can be applied to the details of the trench structure having a high aspect ratio.

3. Optical Device

The optical device according to the present embodiment is equipped with the aforementioned polarizing plate. Examples of the optical device include a liquid crystal projector, a head-up display, and a digital camera. Since the polarizing plate according to the present embodiment has a high transmittance, it is suitable for applications such as liquid crystal projectors and head-up displays that require high luminance.

When the optical device according to the present embodiment includes a plurality of polarizing plates, at least one of the plurality of polarizing plates may be a polarizing plate according to the present disclosure. For example, when the optical device according to the present embodiment is a liquid crystal projector, it will be sufficient for the device to have a polarizing plate according to the present disclosure as at least one of the polarizing plates disposed on the incident side and the outgoing side of the liquid crystal panel.

EXAMPLES

4. Examples

Examples of the present disclosure will be described below. In wire grid polarizing plates, the shape of the grooves formed in the substrate between the grid-shaped protrusions was simulated. It should be noted that the present disclosure is not limited to these examples.

The simulation was performed by electromagnetic field simulation using the RCWA (Rigorous Coupled Wave Analysis) method. A grating simulator "Gsolver" manufactured by Grating Solver Development was used for the simulation.

Groove Having Rectangular Cross-Section

Figure 7:
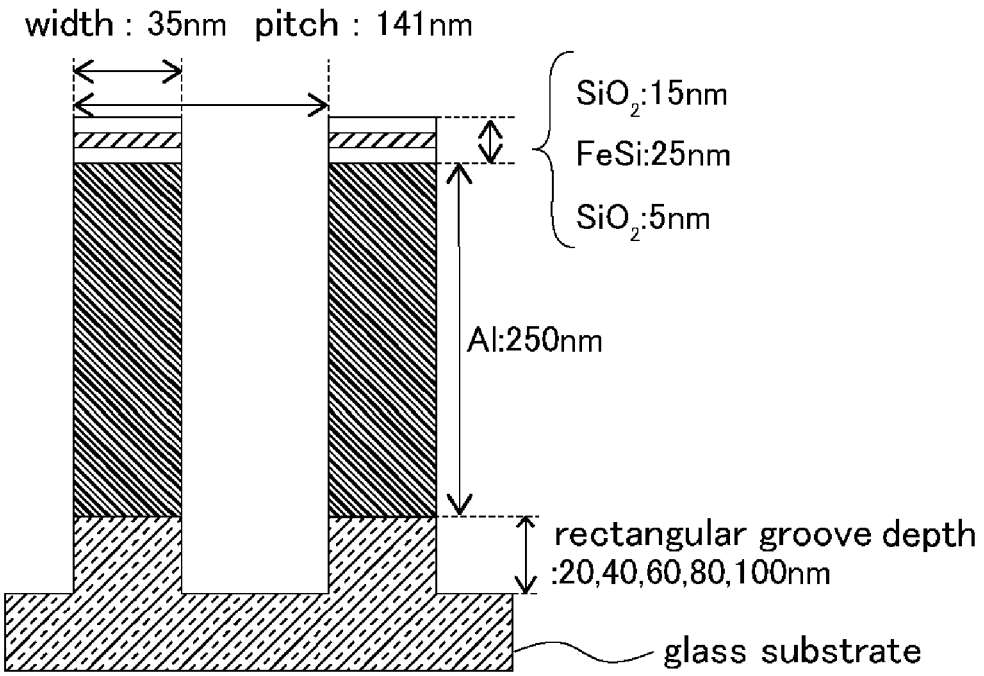
FIG. 7 is a cross-sectional view schematically showing a structure of a conventional polarizing plate in which a cross-sectional shape of a groove is rectangular.

FIG. 7 is a cross-sectional view schematically showing a structure of a conventional polarizing plate in which a cross-sectional shape of a groove is rectangular. The polarizing plate shown in FIG. 7 includes a glass substrate; a reflective layer made of Al having a width W of 35 nm arranged on the glass substrate at a pitch P of 141 nm; and a first $SiO_2$ layer, an FeSi layer, and a second $SiO_2$ layer arranged on the reflective layer. The thickness $T_{42}$ of the reflective layer was 250 nm, the thickness $T_{43}$ of the first $SiO_2$ layer was 5 nm, the thickness $T_{44}$ of the first FeSi layer was 25 nm, and the thickness $T_{45}$ of the second $SiO_2$ layer was 15 nm. In the FeSi layer, Fe content was 5 atm % and the Si content was 95 atm %.

Further, the cross-sectional shape of the groove formed on the glass substrate was made rectangular, and the simulation was performed with the depths of 20 nm, 40 nm, 60 nm, 80 nm, and 100 nm, respectively.

Table 1 shows the simulation results of the average values of the transmission axis transmittance Tp and the transmission axis reflectance Rp of each wavelength band of the conventional polarizing plate in which the cross-sectional shape of the groove is rectangular.

TABLE 1

| | Tp [%] | | | Rp [%] | | |
| --- | --- | --- | --- | --- | --- | --- |
| | wave length 430-510 nm | wave length 520-590 nm | wave length 600-680 nm | wave length 430-510 nm | wave length 520-590 nm | wave length 600-680 nm |
| depth 20 nm | 90.7 | 91.1 | 90.7 | 0.5 | 2.3 | 3.3 |
| depth 40 nm | 91.2 | 91.9 | 91.1 | 0.1 | 1.4 | 3.0 |
| depth 60 nm | 91.3 | 92.5 | 91.4 | 0.3 | 0.8 | 2.6 |
| depth 80 nm | 90.5 | 92.9 | 91.7 | 0.9 | 0.4 | 2.3 |
| depth 100 nm | 89.6 | 93.0 | 92.1 | 1.6 | 0.2 | 1.7 |

Figure 8:
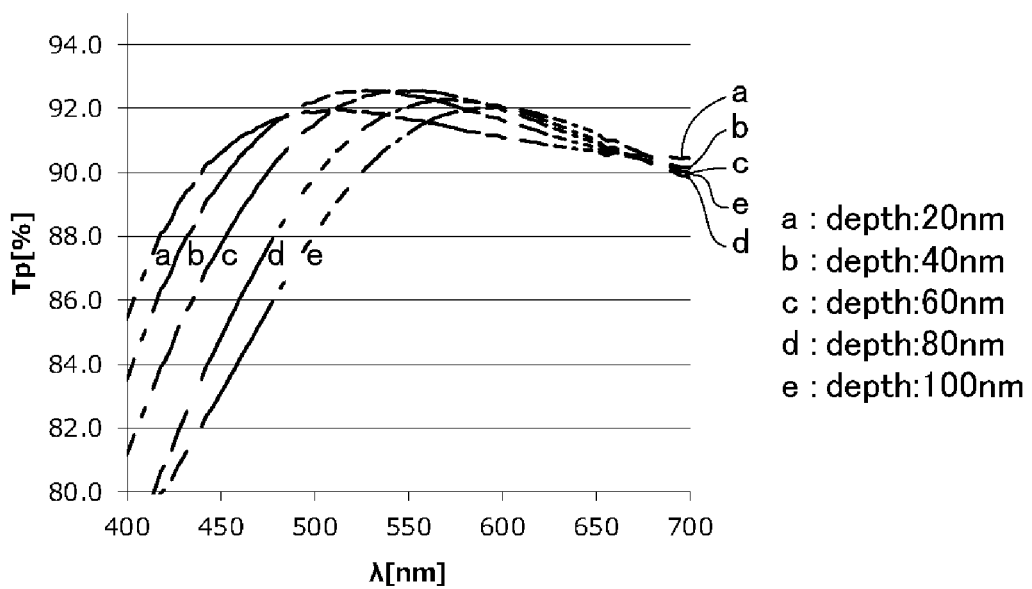
FIG. 8 is a graph showing simulation results of transmission axis transmittance Tp of a conventional polarizing plate in which a groove having a rectangular cross-sectional shape is set to a predetermined depth.
Figure 9:
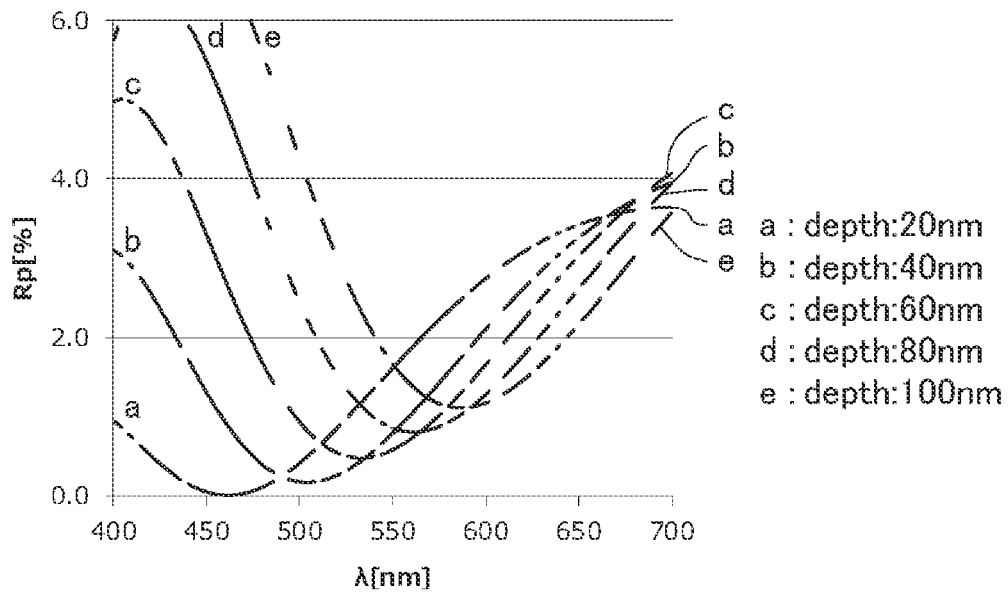
FIG. 9 is a graph showing simulation results of transmission axis reflectance Rp of a conventional polarizing plate in which a groove having a rectangular cross-sectional shape is set to a predetermined depth.

FIG. 8 is a graph showing simulation results of transmission axis transmittance Tp of a conventional polarizing plate in which a groove having a rectangular cross-sectional shape is set to a predetermined depth, and FIG. 9 is a graph showing simulation results of transmission axis reflectance Rp of a conventional polarizing plate in which a groove having a rectangular cross-sectional shape is set to a predetermined depth.

From these results, it was found that when the cross-sectional shape of the groove is rectangular, the transmission axis reflectance Rp in the blue wavelength band (wavelength: 430 to 510 nm) greatly increases and the optical properties are deteriorated. Further, it was found that when the depth of the groove is 60 nm or more, the transmission axis transmittance Tp in the green wavelength band (wavelength: 520 to 590 nm) decreases, and the transmission axis transmittance Tp in the blue wavelength band (wavelength: 430 to 510 nm) decreases as compared with the case where the depth of the groove is 0 nm.

Figure 10:
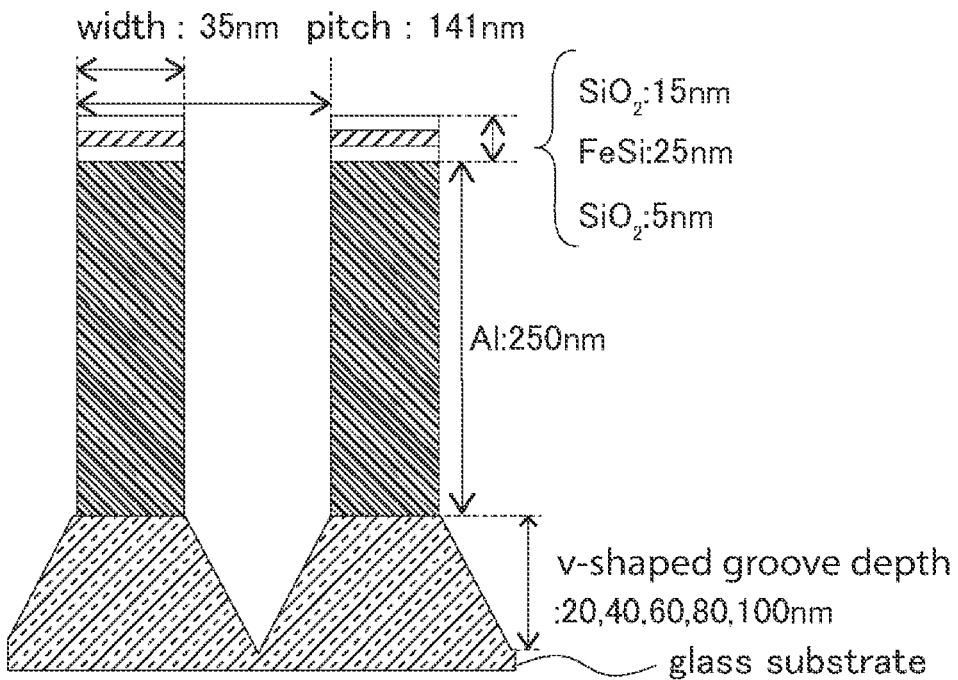
FIG. 10 is a cross-sectional view schematically showing a structure of a polarizing plate in which a cross-sectional shape of a groove is substantially V-shaped.

Groove having substantially V-shaped cross-section FIG. 10 is a cross-sectional view schematically showing a structure of a polarizing plate in which a cross-sectional shape of a groove is substantially V-shaped. The configuration of the polarizing plate shown in FIG. 10 is the same as that of the polarizing plate shown in FIG. 7 except that the cross-sectional shape of the groove recessed in the substrate is substantially V-shaped. That is, the polarizing plate includes a glass substrate; a reflective layer made of Al having a width W of 35 nm arranged on the glass substrate at a pitch P of 141 nm; and a first $SiO_2$ layer, an FeSi layer, and a second $SiO_2$ layer arranged on the reflective layer. The thickness $T_{52}$ of the reflective layer was 250 nm, the thickness $T_{53}$ of the first $SiO_2$ layer was 5 nm, the thickness $T_{54}$ of the first FeSi layer was 25 nm, and the thickness $T_{55}$ of the second $SiO_2$ layer was 15 nm. In the FeSi layer, Fe content was 5 atm % and the Si content was 95 atm %.

Further, the cross-sectional shape of the groove formed on the glass substrate was formed into a substantially V-shaped triangle, and the simulation was performed with the depths of 20 nm, 40 nm, 60 nm, 80 nm, and 100 nm, respectively.

Table 2 shows the simulation results of the average values of the transmission axis transmittance Tp and the transmission axis reflectance Rp of each wavelength band of the polarizing plate in which the cross-sectional shape of the groove is substantially V-shaped.

TABLE 2

| | Tp [%] | | | Rp [%] | | |
|---|---|---|---|---|---|---|
| | wave length 430-510 nm | wave length 520-590 nm | wave length 600-680 nm | wave length 430-510 nm | wave length 520-590 nm | wave length 600-680 nm |
| depth 20 nm | 91.1 | 91.6 | 90.8 | 0.2 | 1.7 | 3.3 |
| depth 40 nm | 90.7 | 92.3 | 90.9 | 0.8 | 1.0 | 3.0 |
| depth 60 nm | 89.3 | 92.4 | 91.1 | 2.3 | 0.8 | 2.8 |
| depth 80 nm | 86.5 | 92.0 | 91.2 | 4.4 | 1.0 | 2.4 |
| depth 100 nm | 84.8 | 91.2 | 91.3 | 6.1 | 1.7 | 2.0 |

Figure 11:
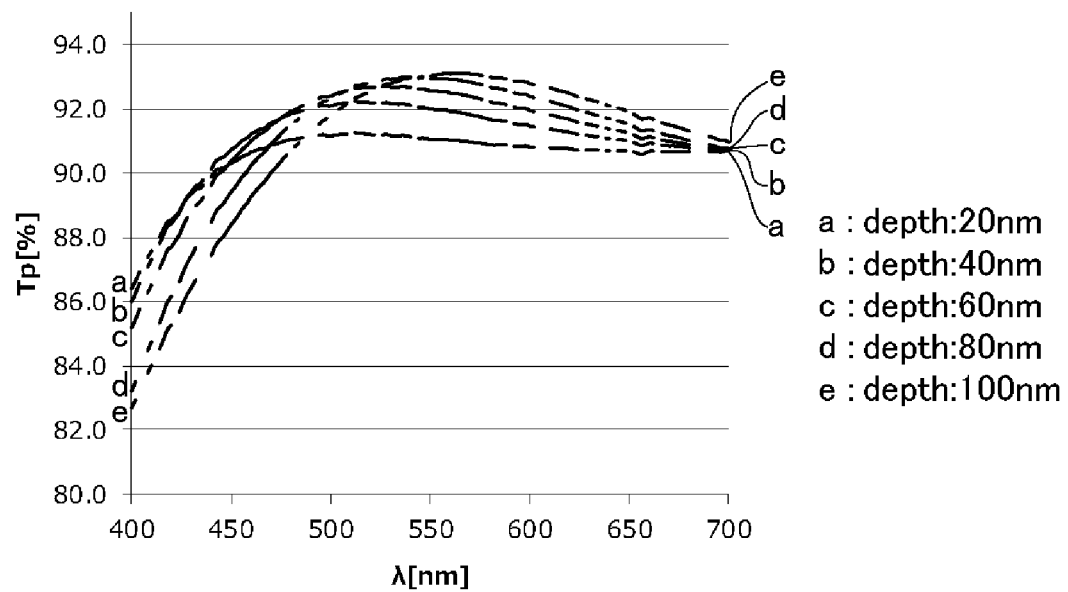
FIG. 11 is a graph showing simulation results of transmission axis transmittance Tp of a polarizing plate in which a groove having a substantially V-shaped cross section is set to a predetermined depth.
Figure 12:
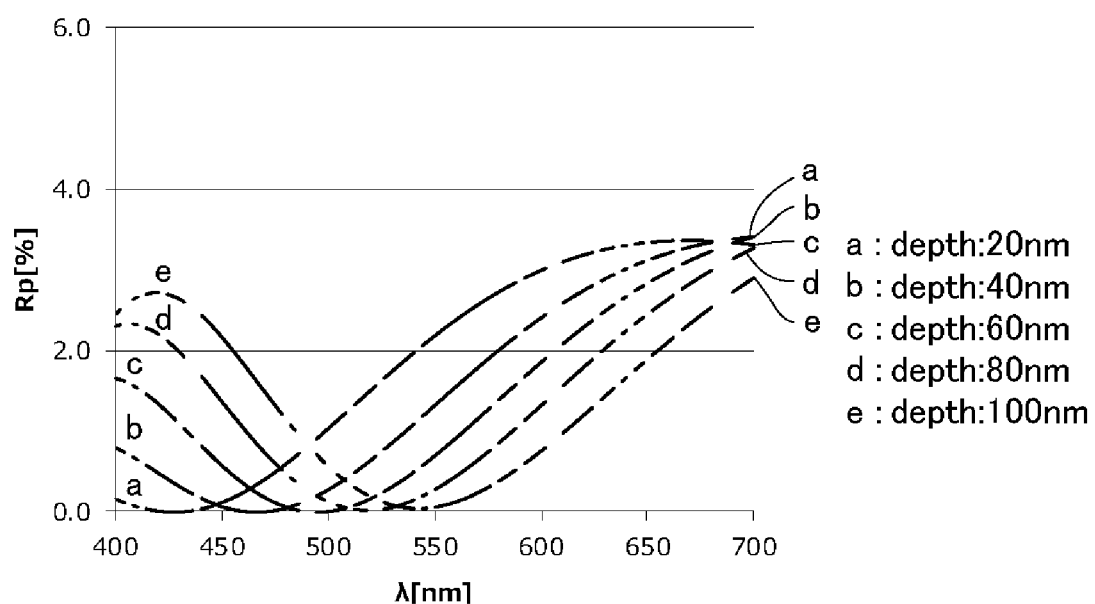
FIG. 12 is a graph showing simulation results of a transmission axis reflectance Rp of a polarizing plate in which a groove having a substantially V-shaped cross section is set to a predetermined depth.

FIG. 11 is a graph showing simulation results of transmission axis transmittance Tp of a polarizing plate in which a groove having a substantially V-shaped cross section is set to a predetermined depth, and FIG. 12 is a graph showing simulation results of a transmission axis reflectance Rp of a polarizing plate in which a groove having a substantially V-shaped cross section is set to a predetermined depth.

Figure 13:
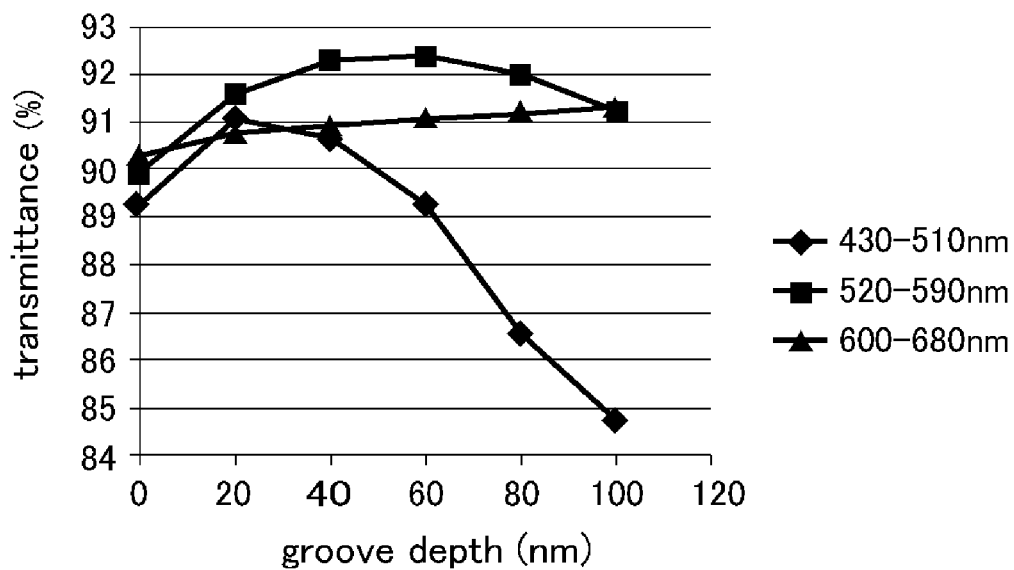
FIG. 13 is a graph showing simulation results of average values of transmission axis transmittance Tp of respective wavelength bands of a polarizing plate in which a groove having a rectangular cross-sectional shape according to a conventional example is set to a predetermined depth.
Figure 14:
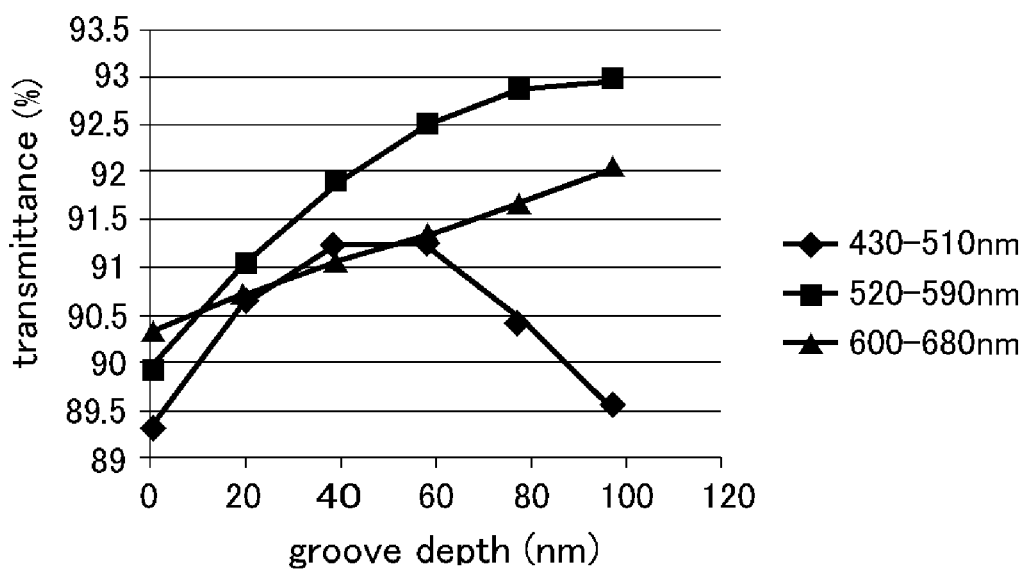
FIG. 14 is a graph showing simulation results of average values of transmission axis transmittance Tp of respective wavelength bands of a polarizing plate in which a groove having a substantially V-shaped cross section is set to a predetermined depth.

In addition, FIG. 13 is a graph showing simulation results of average values of transmission axis transmittance Tp of respective wavelength bands of a polarizing plate in which a groove having a rectangular cross-sectional shape according to a conventional example is set to a predetermined depth, and FIG. 14 is a graph showing simulation results of average values of transmission axis transmittance Tp of respective wavelength bands of a polarizing plate in which a groove having a substantially V-shaped cross section is set to a predetermined depth.

From these results, it was found that when the cross-sectional shape of the groove is substantially V-shaped, excellent optical properties can be obtained by increasing the transmission axis transmittance Tp and decreasing the transmission axis reflectance Rp in the green wavelength band (wavelength: 520 to 590 nm) and the red wavelength band (wavelength: 600 to 680 nm). Further, it was found that when the cross-sectional shape of the groove is substantially V-shaped, a decrease in the transmission axis transmittance Tp in the blue wavelength band (wavelength: 430 to 510 nm) is suppressed as compared with when the cross-sectional shape of the groove is rectangular. Further, it was found that when the depth of the groove is 60 nm or more and 100 nm or less, the transmission axis transmittance Tp of the blue wavelength band is larger than that when the depth of the groove is 0 nm, and excellent optical properties can be obtained.

Figure 15:
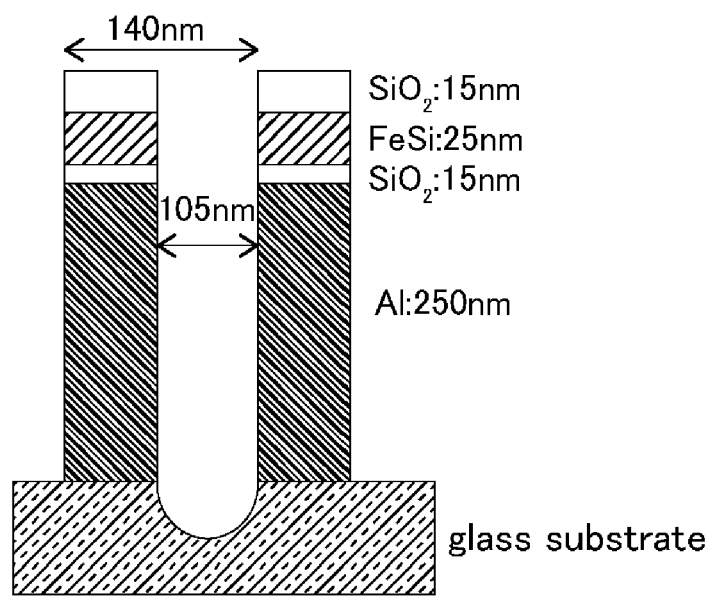
FIG. 15 is a cross-sectional view schematically showing a structure of a polarizing plate in which a cross-sectional shape of a groove is substantially U-shaped.

Groove having substantially U-shaped cross-section FIG. 15 is a cross-sectional view schematically showing a structure of a polarizing plate in which a cross-sectional shape of a groove is substantially U-shaped. The configuration of the polarizing plate shown in FIG. 15 is the same as that of the polarizing plate shown in FIG. 7 except that the cross-sectional shape of the groove recessed in the substrate is substantially U-shaped. That is, the polarizing plate includes a glass substrate; a reflective layer made of Al having a width W of 35 nm arranged on the glass substrate at a pitch P of 141 nm; and a first $SiO_2$ layer, an FeSi layer, and a second $SiO_2$ layer arranged on the reflective layer. The thickness $T_{52}$ of the reflective layer was 250 nm, the thickness $T_{53}$ of the first $SiO_2$ layer was 5 nm, the thickness $T_{54}$ of the first FeSi layer was 25 nm, and the thickness $T_{55}$ of the second $SiO_2$ layer was 15 nm. In the FeSi layer, Fe content was 5 atm % and the Si content was 95 atm %.

Further, the cross-sectional shape of the groove formed on the glass substrate was substantially U-shaped, and the simulation was performed with the depths of 20 nm, 40 nm, 60 nm, 80 nm, 100 nm, and 120 nm respectively.

Figure 16:
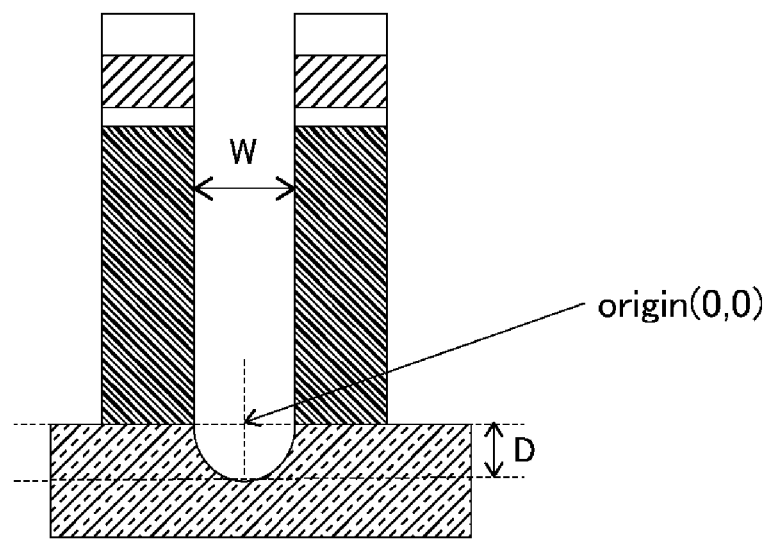
FIG. 16 is a cross-sectional view schematically showing a structure of a groove in which a cross-sectional shape of a groove is substantially U-shaped.
Figure 17:
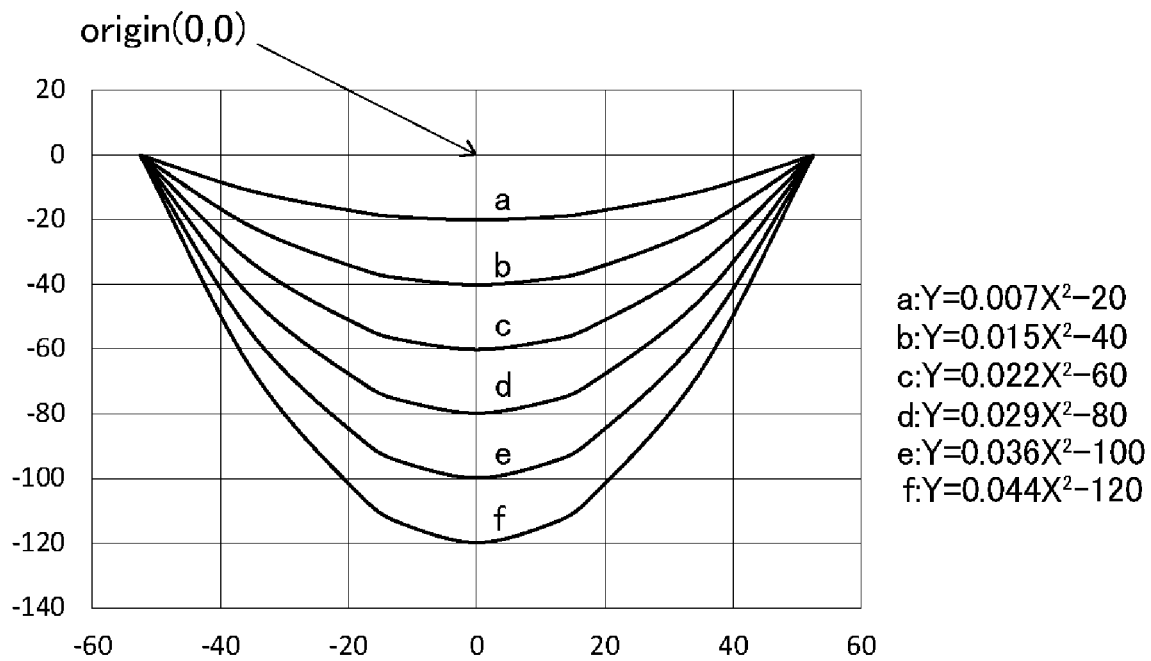
FIG. 17 is a graph showing a curve of a cross-sectional shape of a groove in which a cross-sectional shape of a groove is substantially U-shaped.

FIG. 16 is a cross-sectional view schematically showing a structure of a groove in which a cross-sectional shape of a groove is substantially U-shaped, and FIG. 17 is a graph showing a curve of a cross-sectional shape of a groove in which a cross-sectional shape of a groove is substantially U-shaped.

As shown in FIGS. 16 and 17, the cross-sectional shape of the groove is a quadratic curve satisfying the following equation, where the origin (0, 0) is the midpoint of the width of the groove at which the depth of the groove is zero, the grid interval is W, and the depth of the groove is D.

$$Y=(4D/W^2)*X^2-D$$

That is, as shown in FIG. 17, the curves (a) to (f) of the cross-sectional shape of the groove having a depth of 20 to 120 nm are expressed by the following equation.

(a) $Y=0.007X^2-20$, (b) $Y=0.015X^2-40$, (c) $Y=0.022X^2-60$, (d) $Y=0.029X^2-80$, (e) $Y=0.036X^2-100$, and (f) $Y=0.044X^2-120$.

Figure 18:
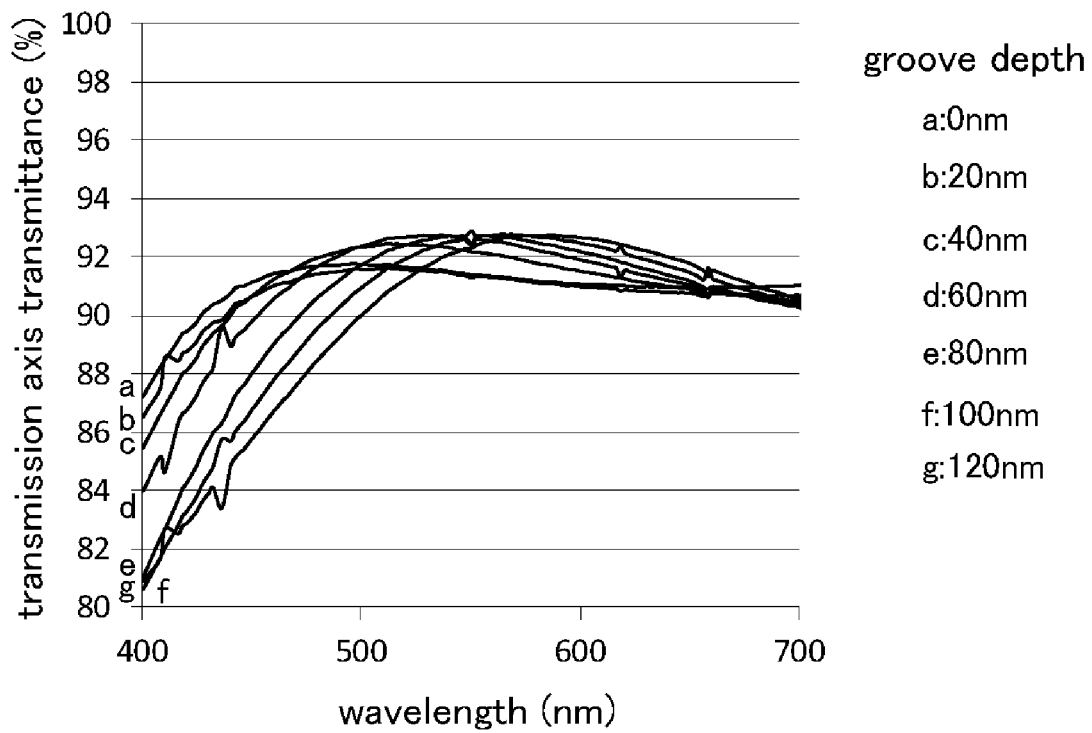
FIG. 18 is a graph showing simulation results of transmission axis transmittance Tp of a polarizing plate in which a groove having a substantially U-shaped cross section is set to a predetermined depth.
Figure 19:
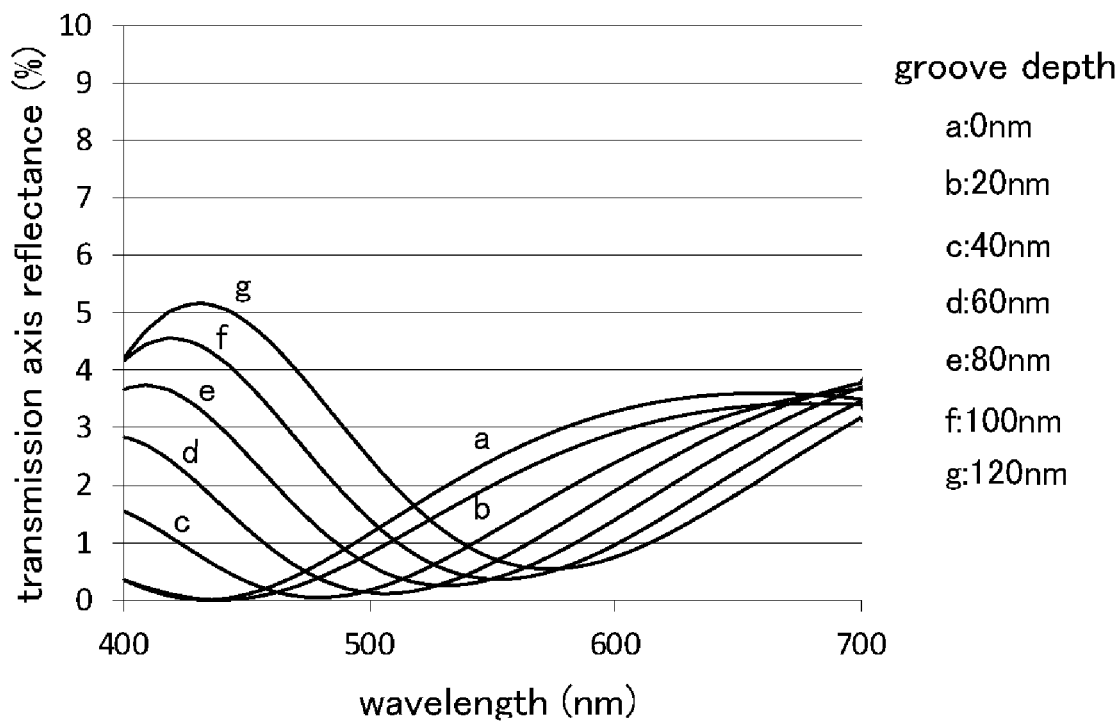
FIG. 19 is a graph showing simulation results of transmission axis reflectance Rp of a polarizing plate in which a groove having a substantially U-shaped cross section is set to a predetermined depth.

FIG. 18 is a graph showing simulation results of transmission axis transmittance Tp of a polarizing plate in which a groove having a substantially U-shaped cross section is set to a predetermined depth, and FIG. 19 is a graph showing simulation results of transmission axis reflectance Rp of a polarizing plate in which a groove having a substantially U-shaped cross section is set to a predetermined depth.

Figure 20:
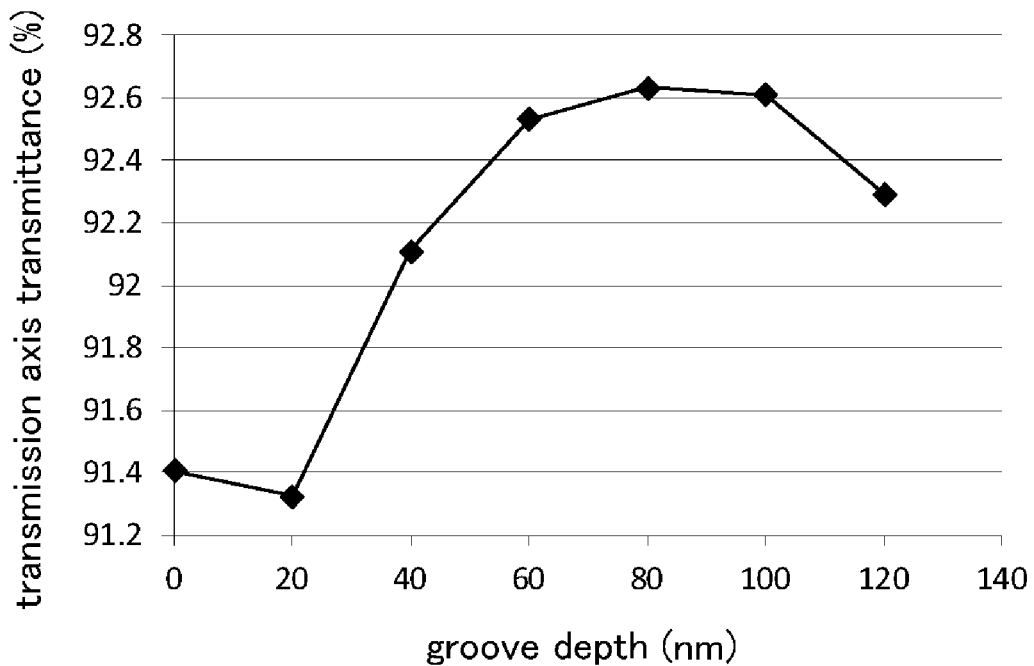
FIG. 20 is a graph showing simulation results of average values of transmission axis transmittance Tp in the green wavelength band with respect to the depth of a groove having a substantially U-shaped cross section.
Figure 21:
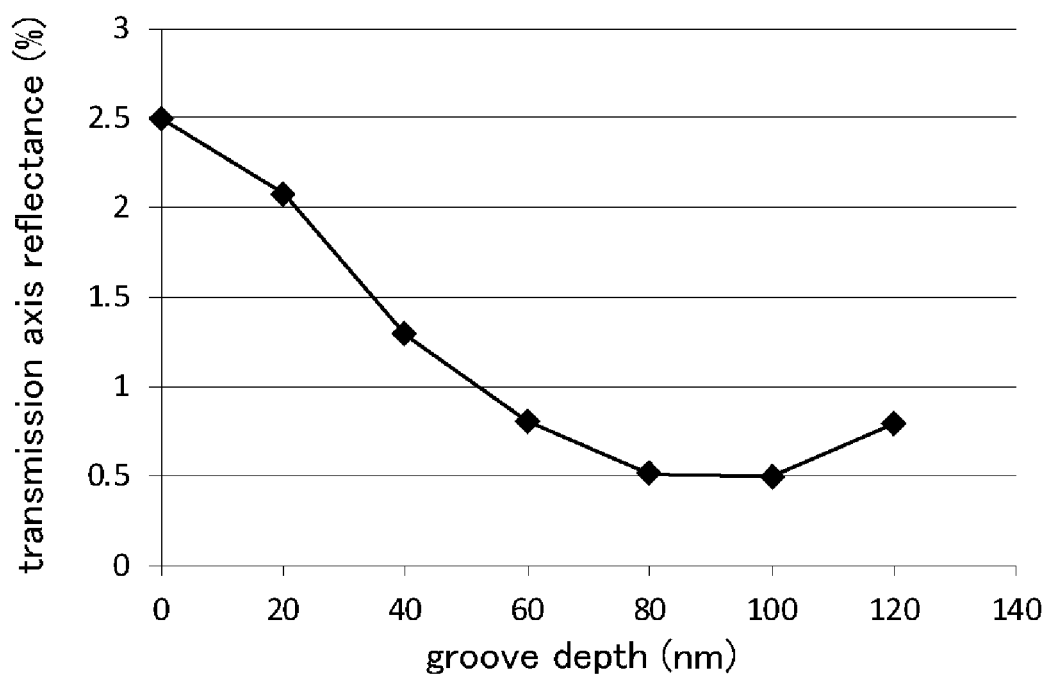
FIG. 21 is a graph showing simulation results of average values of transmission axis reflectance Rp in the green wavelength band with respect to the depth of a groove having a substantially U-shaped cross section.

FIG. 20 is a graph showing simulation results of average values of transmission axis transmittance Tp in the green wavelength band with respect to the depth of a groove having a substantially U-shaped cross section, and FIG. 21 is a graph showing simulation results of average values of transmission axis reflectance Rp in the green wavelength band with respect to the depth of a groove having a substantially U-shaped cross section.

From these results, it was found that when the cross-sectional shape of the groove is substantially U-shaped, excellent optical properties can be obtained by increasing the transmission axis transmittance Tp and decreasing the transmission axis reflectance Rp in the green wavelength band (wavelength: 520 to 590 nm) and the red wavelength band (wavelength: 600 to 680 nm). Further, it was found that when the cross-sectional shape of the groove is substantially U-shaped, a decrease in the transmission axis transmittance Tp in the blue wavelength band (wavelength: 430 to 510 nm) is suppressed as compared with when the cross-sectional shape of the groove is rectangular. Further, it was found that when the depth of the groove is 60 nm or more and 120 nm or less, excellent optical properties can be obtained because the transmission axis transmittance Tp in the green wavelength band is large and the transmission axis reflectance Rp in the green wavelength band is small.

Groove Having Substantially U-Shaped Cross-Section (Asymmetric)

Figure 22:
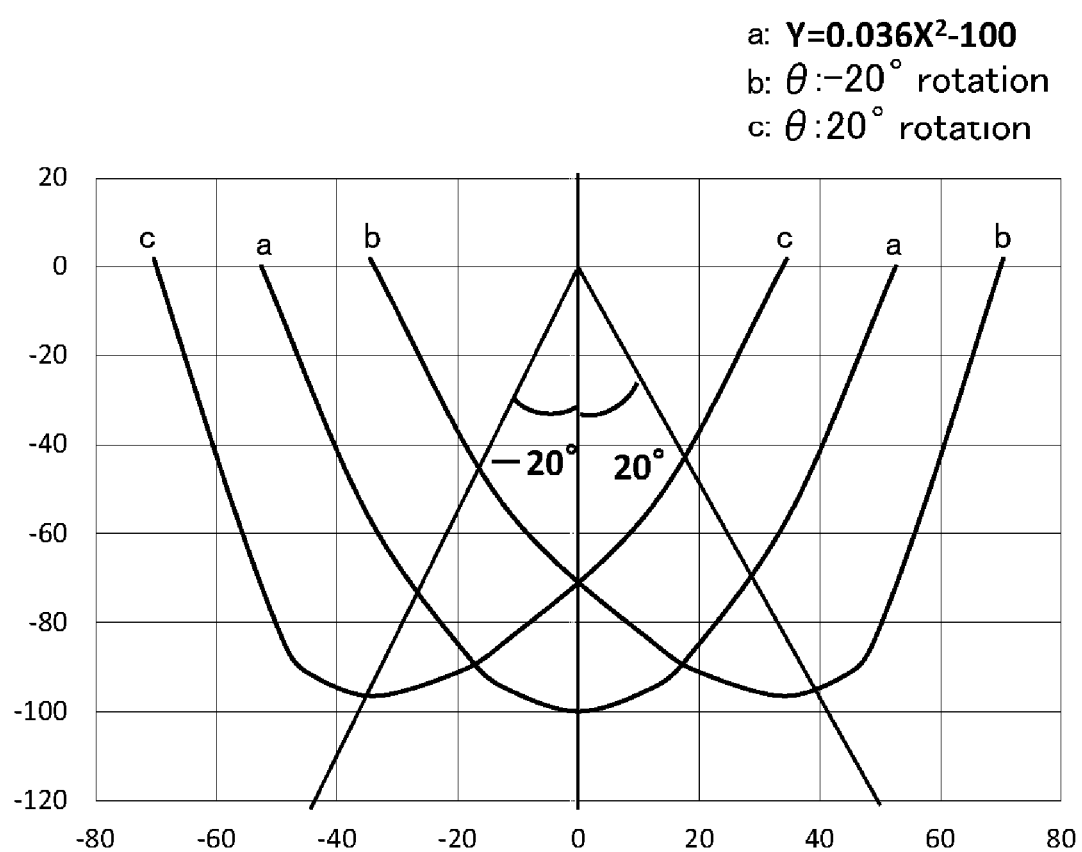
FIG. 22 is a graph showing the angular relation between a perpendicular line passing through the midpoint (origin) of the width at which the depth of the groove is zero and a straight line passing through the deepest point of the groove and the origin.

FIG. 22 is a graph showing the angular relation between a perpendicular line passing through the midpoint (origin) of the width at which the depth of the groove is zero and a straight line passing through the deepest point of the groove and the origin. In FIG. 22, curve (a) represents $Y=0.036X^2-100$, curve (b) represents a curve having an angle of 20° between a perpendicular line passing through the midpoint (origin) of the width at which the depth of the groove is zero and a straight line connecting the origin and the deepest point of curve (b), and curve (c) represents a curve having an angle of −20° between a perpendicular line passing through the midpoint (origin) of the width at which the depth of the groove is zero and a straight line connecting the origin and the deepest point of curve (c).

As shown in FIG. 22, a simulation was performed on polarizing plates having cross-sectional shapes of the grooves corresponding to curves (a), (b), and (c). The configuration of the polarizing plate was the same as that of the polarizing plate shown in FIG. 15 except that the cross-sectional shapes of the grooves formed in the substrates corresponded to curves (a), (b), and (c).

Figure 23:
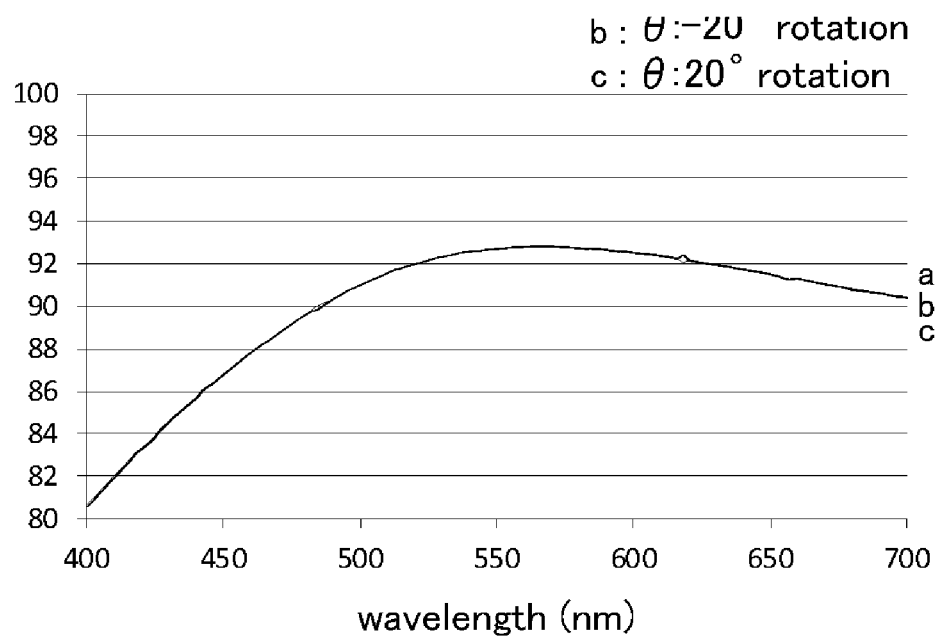
FIG. 23 is a graph showing simulation results of transmission axis transmittance Tp of a polarizing plate in which the cross-sectional shapes of grooves are curves (a), (b), and (c).
Figure 24:
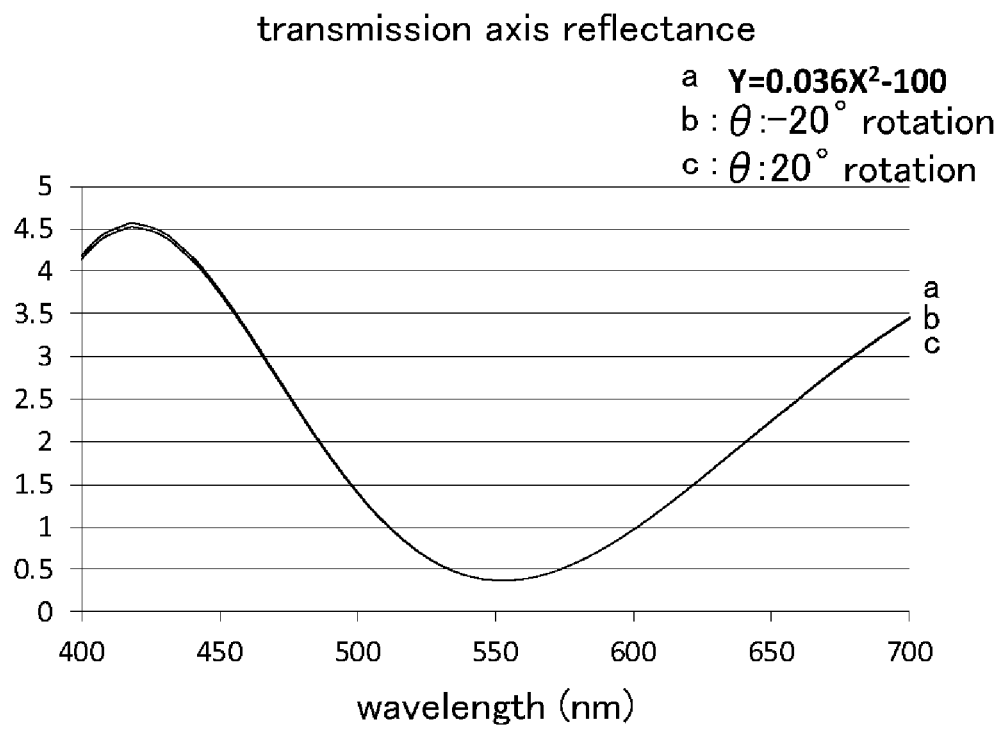
FIG. 24 is a graph showing simulation results of transmission axis reflectance Rp of the polarizing plate in which the cross-sectional shapes of grooves are curves (a), (b), and (c).
Figure 25:
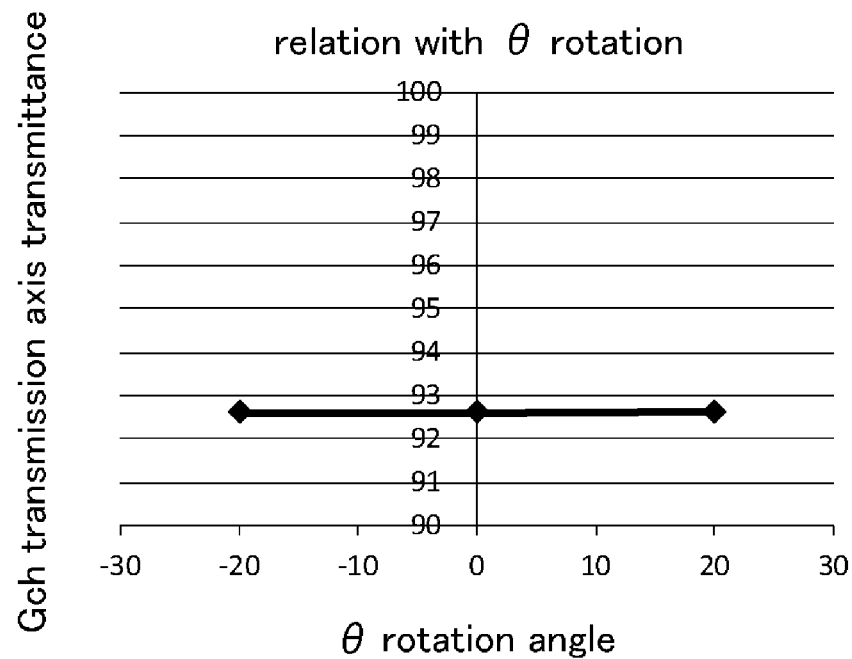
FIG. 25 is a graph showing simulation results of average values of transmission axis transmittance Tp in the green wavelength band for a polarizing plate in which the angle between the perpendicular line passing through the midpoint (origin) of the width at which the depth of the groove is zero and the straight line passing through the deepest point of the groove and the origin is θ.
Figure 26:
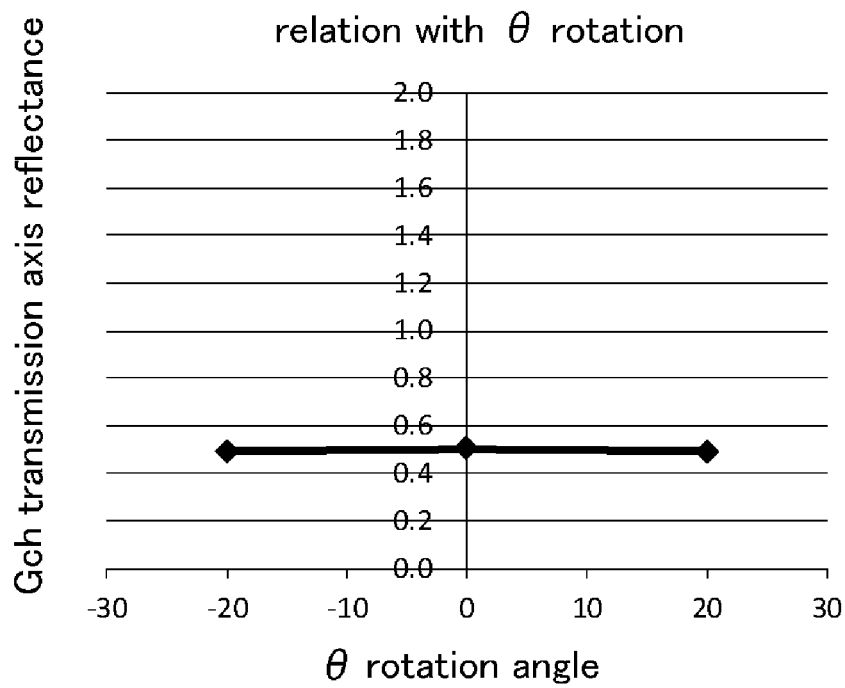
FIG. 26 is a graph showing simulation results of average values of the transmission axis reflectance Rp in the green wavelength band for a polarizing plate in which the angle between the perpendicular line passing through the midpoint (origin) of the width at which the depth of the groove is zero and the straight line passing through the deepest point of the groove and the origin is θ.

FIG. 23 is a graph showing simulation results of transmission axis transmittance Tp of a polarizing plate in which the cross-sectional shapes of grooves are curves (a), (b), and (c), and FIG. 24 is a graph showing simulation results of transmission axis reflectance Rp of the polarizing plate in which the cross-sectional shapes of grooves are curves (a), (b), and (c). FIG. 25 is a graph showing simulation results of average values of transmission axis transmittance Tp in the green wavelength band for a polarizing plate in which the angle between the perpendicular line passing through the midpoint (origin) of the width at which the depth of the groove is zero and the straight line passing through the deepest point of the groove and the origin is θ, and FIG. 26 is a graph showing simulation results of average values of the transmission axis reflectance Rp in the green wavelength band for a polarizing plate in which the angle between the perpendicular line passing through the midpoint (origin) of the width at which the depth of the groove is zero and the straight line passing through the deepest point of the groove and the origin is θ.

From these results, it was found that when the angle between the perpendicular line passing through the midpoint (origin) of the width at which the depth of the groove is zero and the straight line passing through the deepest point of the groove and the origin is within ±20°, the optical properties equivalent to those of a polarizing plate whose angle between the deepest point of the groove and the straight line passing through the origin is 0° can be obtained.

Consideration of Cross-Sectional Shape of Groove

Figure 27:
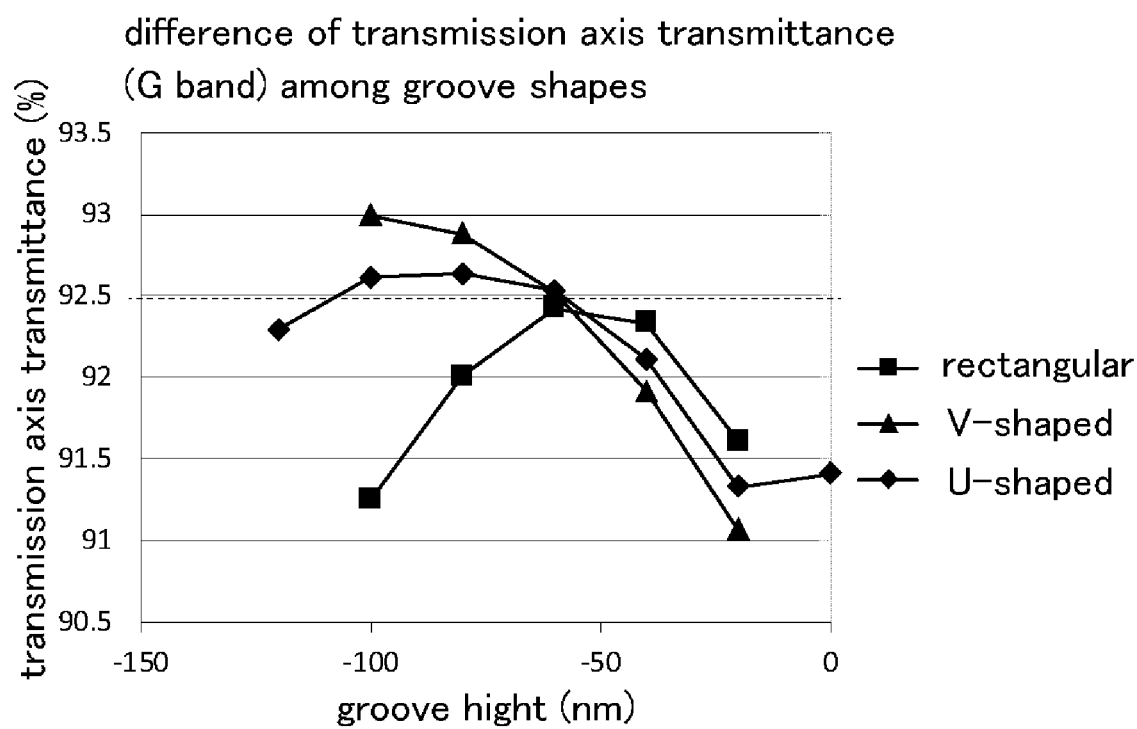
FIG. 27 is a graph showing simulation results of the average values of the transmission axis transmittance Tp in the green wavelength band with respect to a polarizing plate in which a groove having a rectangular, substantially V-shaped, or substantially U-shaped cross section is set to a predetermined depth.

FIG. 27 is a graph showing simulation results of the average values of the transmission axis transmittance Tp in the green wavelength band with respect to a polarizing plate in which a groove having a rectangular, substantially V-shaped, or substantially U-shaped cross section is set to a predetermined depth. The polarizing plates having a groove with a rectangular, substantially V-shaped, and substantially U-shaped cross sections are the same as the polarizing plates shown in FIGS. 7, 10, and 15, respectively.

As a result of this simulation, it was found that by setting the depth of the groove to 60 nm or more and 100 nm or less, a higher transmission axis transmittance Tp can be obtained as compared with the groove having a rectangular cross-sectional shape.

Figure 28:
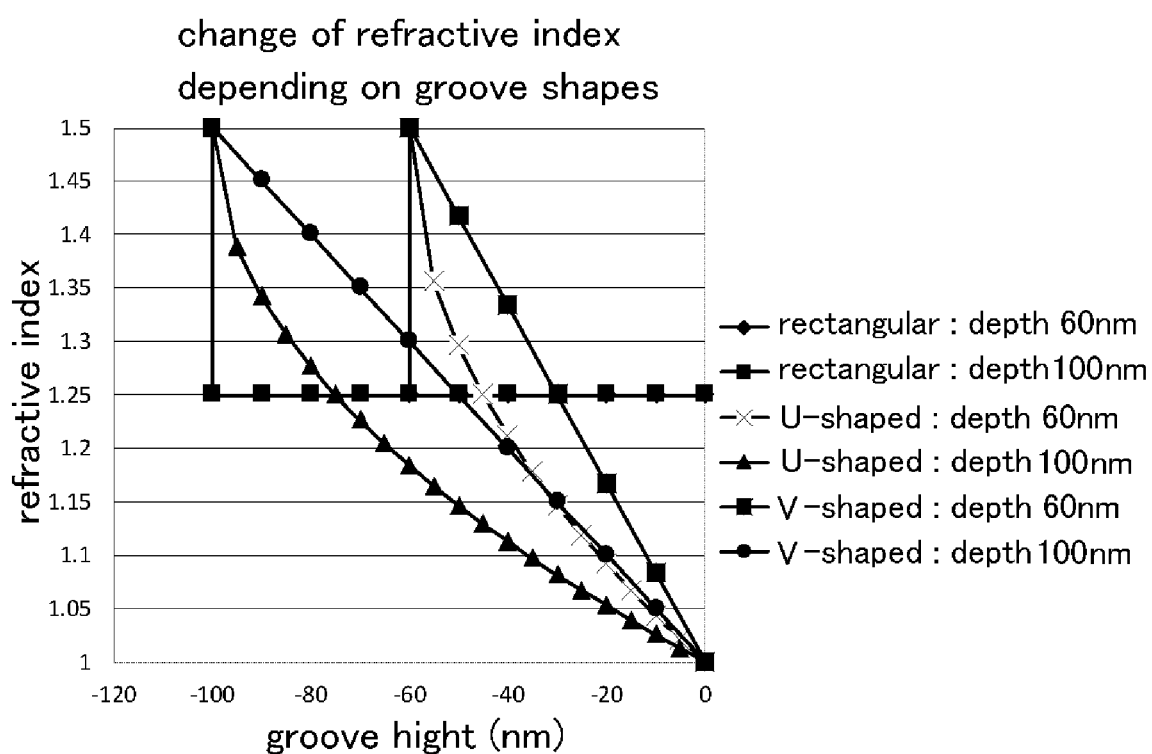
FIG. 28 is a graph showing simulation results of a refractive index with respect to a depth direction of a groove having a rectangular, substantially V-shaped, or substantially U-shaped cross section.

FIG. 28 is a graph showing simulation results of a refractive index with respect to a depth direction of a groove having a rectangular, substantially V-shaped, or substantially U-shaped cross section. In the simulation, the refractive index of air was 1.0, the refractive index of the substrate was 1.5, the pitch was 200 nm, and the width between grids was 100 nm.

The rectangular groove having a depth of 60 nm has a refractive index of 1.25 from 0 nm to less than 60 nm, and has a change point where the refractive index greatly changes to 1.5 when the depth is 60 nm. On the other hand, since the width of the substantially V-shaped groove or the substantially U-shaped groove having a depth of 60 nm is reduced to zero in the depth direction, the refractive index gradually changes from 1 to 1.5 and does not have a large change point of the refractive index. It is considered that by forming the groove so that the refractive index does not have a large change point, the transmittance and the reflectance properties are improved.

The refractive index with respect to the depth of the substantially V-shaped groove having a depth of 60 nm is represented by $y=0.0083x+1$ ($-60 \leq x \leq 0$). The refractive index with respect to the depth of the substantially U-shaped groove having a depth of 100 nm is represented by $y=2E-0.8x^4+2E-06x^3+0.0001x^2-0.0004x+1.0061$ ($-100 \leq x \leq 0$). Alternatively, the refractive index with respect to the depth of the substantially U-shaped groove having a depth of 100 nm is represented by $y=0.0005x^2+0.0791x+4.423$ ($-100 \leq x \leq 80$) and $y=2E-05x^2+0.0021x+1.0026$ ($-80 \leq x \leq 0$).

Therefore, when the depth of the groove is 0 nm or more and 60 nm or less, the width of the cross section of the groove may be reduced to zero in the depth direction so as to satisfy $y \leq 0.0083x+1$ ($-60 \leq x \leq 0$) and $y \geq 2E-0.8x^4+2E-06x^3+0.0001x^2-0.0004x+1.0061$ ($-60 \leq x \leq 0$). When the depth of the groove is 60 nm or more and 100 nm or less, the width of the cross section of the groove may be reduced to zero in the depth direction so as to satisfy $1.5 \geq y \geq 2E-0.8x^4+2E-06x^3+0.0001x^2-0.0004x+1.0061$ ($-100 \leq x \leq -60$).

REFERENCE SIGNS LIST 11 transparent substrate, 12 reflective layer, 13 reflection control layer, 14A, 14B, 14C grooves, 21 transparent substrate, 22 reflective layer, 23A first dielectric layer, 23B absorbing layer, 23C second dielectric layer, 31 transparent substrate, 32 reflective layer, 33 reflection suppressing layer, 41 transparent substrate, 42 reflective layer, 43 reflection suppressing layer

The invention claimed is:

1. A polarizing plate comprising:
   a transparent substrate that is transparent to light in a used wavelength band;
   grid-shaped protrusions arranged on the transparent substrate at a pitch shorter than the wavelength of the light in the used band, extending in a predetermined direction, and having a reflective layer and a reflection suppressing layer in this order; and
   a groove which is recessed in the transparent substrate between the grid-shaped protrusions to a depth of 60 nm or more and 120 nm or less and with a substantially U-shape that does not have a bottom surface, wherein
   the reflection suppressing layer is a mixture of a light absorbing material and a dielectric,
   the reflection suppressing layer width in a direction orthogonal to the predetermined direction becomes smaller toward the tip side,
   the polarizing plate has a transmission axis reflectance of 1% or less in the green wavelength band, and
   the reflection suppressing layer contains Fe or Ta with Si, and has a concentration distribution in which the concentration of Fe or Ta is inclined in the layer thickness direction.

2. The polarizing plate according to claim 1, wherein the cross-sectional shape of the groove in a direction orthogonal to the predetermined direction is asymmetric with respect to a perpendicular line passing through a midpoint of a width at which the depth of the groove is zero.

3. The polarizing plate according to claim 1, wherein an angle between a perpendicular line passing through a midpoint of the width at which the depth of the groove is zero and a straight line passing through a deepest point of the groove and the midpoint is between +20° and −20°.

4. An optical device equipped with the polarizing plate according to claim 1.

5. The polarizing plate according to claim 1, wherein the groove has a substantially U-shape, and
a width X in the direction orthogonal to the predetermined direction with respect to the depth Y of the groove satisfies:

$$Y=(4D/W^2)*X^2-D$$

where the origin (0, 0) is the midpoint of the width of the groove at which the depth of the groove is zero, the grid interval is W, and the depth of the groove is D wherein 60≤D≤120.

6. The polarizing plate according to claim 1, wherein a width of a bottom of the groove in the direction orthogonal to the predetermined direction is 10 nm or less.

7. A method of manufacturing a polarizing plate comprising:
etching a reflective layer and a reflection suppressing layer laminated on a transparent substrate that is transparent to light in a used wavelength band to form grid-shaped protrusions arranged at a pitch shorter than the wavelength of light in the used band and extending in a predetermined direction, and a groove which is recessed in the transparent substrate between the grid-shaped protrusions to a depth of 60 nm or more and 120 nm or less and with a substantially U-shape that does not have a bottom surface, wherein
the reflection suppressing layer is a mixture of a light absorbing material and a dielectric,
the reflection suppressing layer width in a direction orthogonal to the predetermined direction becomes smaller toward the tip side,
the polarizing plate has a transmission axis reflectance of 1% or less in the green wavelength band, and
the reflection suppressing layer contains Fe or Ta with Si, and has a concentration distribution in which the concentration of Fe or Ta is inclined in the layer thickness direction.

8. The method of manufacturing a polarizing plate according to claim 7, wherein the groove has a substantially U-shape, and
a width X in the direction orthogonal to the predetermined direction with respect to the depth Y of the groove satisfies:

$$Y=(4D/W^2)*x^2-D$$

where the origin (0, 0) is the midpoint of the width of the groove at which the depth of the groove is zero, the grid interval is W, and the depth of the groove is D wherein 60≤D≤120.

9. The method of manufacturing a polarizing plate according to claim 7, wherein a width of a bottom of the groove in the direction orthogonal to the predetermined direction is 10 nm or less.

10. A polarizing plate comprising:
a transparent substrate that is transparent to light in a used wavelength band;
grid-shaped protrusions arranged on the transparent substrate at a pitch shorter than the wavelength of the light in the used band, extending in a predetermined direction, and having a reflective layer, a first dielectric layer, an absorbing layer and a second dielectric layer in this order; and
a groove which is recessed in the transparent substrate between the grid-shaped protrusions to a depth of 60 nm or more and 120 nm or less and with a substantially U-shape that does not have a bottom surface, wherein
the polarizing plate has a transmission axis reflectance of 1% or less in the green wavelength band, and
the first dielectric layer has a thickness less than the second dielectric layer.

11. The polarizing plate according to claim 10, wherein an angle between a perpendicular line passing through a midpoint of the width at which the depth of the groove is zero and a straight line passing through a deepest point of the groove and the midpoint is between +20° and −20°.

12. The polarizing plate according to claim 10, wherein the absorbing layer contains Fe or Ta with Si.

13. The polarizing plate according to claim 10, wherein the groove has a substantially U-shape, and
a width X in the direction orthogonal to the predetermined direction with respect to the depth Y of the groove satisfies:

$$Y=(4D/W^2)*X^2-D$$

where the origin (0, 0) is the midpoint of the width of the groove at which the depth of the groove is zero, the grid interval is W, and the depth of the groove is D wherein 60≤D≤120.

14. The polarizing plate according to claim 10, wherein a width of a bottom of the groove in the direction orthogonal to the predetermined direction is 10 nm or less.

* * * * *